United States Patent
Jackson et al.

(10) Patent No.: US 10,321,293 B2
(45) Date of Patent: Jun. 11, 2019

(54) METHODS FOR COMMUNICATING SENSOR DATA BETWEEN DEVICES

(71) Applicant: TomTom Software Ltd, Amsterdam (NL)

(72) Inventors: Stephen Michael Jackson, London (GB); Mark Gretton, London (GB)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 602 days.

(21) Appl. No.: 14/773,421

(22) PCT Filed: Mar. 10, 2014

(86) PCT No.: PCT/EP2014/054613
§ 371 (c)(1),
(2) Date: Sep. 8, 2015

(87) PCT Pub. No.: WO2014/135711
PCT Pub. Date: Sep. 12, 2014

(65) Prior Publication Data
US 2016/0029148 A1    Jan. 28, 2016

(30) Foreign Application Priority Data
Mar. 8, 2013    (GB) .................................. 1304219.7

(51) Int. Cl.
*H04W 8/00* (2009.01)
*H04W 4/80* (2018.01)
(Continued)

(52) U.S. Cl.
CPC ............... *H04W 4/80* (2018.02); *H04W 4/70* (2018.02); *H04W 8/005* (2013.01); *H04W 48/16* (2013.01);
(Continued)

(58) Field of Classification Search
CPC combination set(s) only.
See application file for complete search history.

(56) References Cited

U.S. PATENT DOCUMENTS 9,084,215 B2    7/2015    Honkanen et al.
2005/0220221 A1*  10/2005    Grignani ........... H04L 29/12047
                                                    375/316
(Continued)

FOREIGN PATENT DOCUMENTS

CN    102461130 A    5/2012
CN    102625232 A    8/2012
(Continued)

OTHER PUBLICATIONS

Search Report of United Kingdom application No. GB1304219.7 dated Aug. 16, 2013.
(Continued)

*Primary Examiner* — Nay A Maung
*Assistant Examiner* — Erica L Fleming-Hall

(57) ABSTRACT

A low power method of wirelessly transmitting sensor data between devices is disclosed in which a data connection is not required to be established between the devices in order to transfer the sensor data. The method comprises providing a first device (550) having sensor data therein received from at least one sensor. The first device (550) is operated in an advertising state so as to periodically and wirelessly broadcast data packets, wherein each data packet includes an identifier for identifying the first device and also includes said data from the at least one sensor (561, 562). A second device (552) is operated in a scanning state in which the second device (552) scans for data packets broadcast by other devices. The second device (552) receives (563) a data packet from the first device (550), determines the identity of the first device from said identifier, extracts the sensor data (Continued)

(564), and provides an output that indicates the identity of the first device and the sensor data associated with the first device (550).

20 Claims, 11 Drawing Sheets

(51) Int. Cl.
H04W 76/14 (2018.01)
H04W 4/70 (2018.01)
H04W 48/16 (2009.01)
H04W 72/00 (2009.01)
H04W 84/20 (2009.01)

(52) U.S. Cl.
CPC ......... H04W 72/005 (2013.01); H04W 76/14 (2018.02); *H04W 84/20* (2013.01); *Y02D 70/142* (2018.01); *Y02D 70/144* (2018.01); *Y02D 70/164* (2018.01); *Y02D 70/26* (2018.01)

(56) References Cited

U.S. PATENT DOCUMENTS

| | | | |
|---|---|---|---|
| 2007/0049198 A1* | 3/2007 | Walsh ................ | H04M 1/6066 455/41.2 |
| 2008/0044012 A1* | 2/2008 | Ekberg ................ | H04W 12/02 380/30 |
| 2010/0292050 A1* | 11/2010 | DiBenedetto ...... | A63B 24/0062 482/9 |
| 2012/0083210 A1* | 4/2012 | Cutrignelli ............ | H04W 84/20 455/41.2 |
| 2012/0178471 A1* | 7/2012 | Kainulainen ......... | G01S 5/0009 455/456.1 |
| 2012/0196534 A1* | 8/2012 | Kasslin ................ | H04W 76/40 455/41.2 |
| 2012/0257604 A1 | 10/2012 | Honkanen et al. | |
| 2013/0065584 A1* | 3/2013 | Lyon ..................... | H04W 28/06 455/434 |
| 2013/0090061 A1* | 4/2013 | Linde ..................... | H04W 8/005 455/41.2 |
| 2013/0188538 A1* | 7/2013 | Kainulainen ............. | G01S 3/48 370/310 |
| 2013/0201915 A1* | 8/2013 | Wang ...................... | H04W 4/70 370/328 |
| 2013/0321209 A1* | 12/2013 | Kalliola .................... | G01S 5/02 342/419 |
| 2014/0094123 A1* | 4/2014 | Polo .................. | H04W 52/0216 455/41.2 |
| 2014/0133656 A1* | 5/2014 | Wurster ................ | H04L 9/0637 380/270 |
| 2014/0157135 A1* | 6/2014 | Lee ........................ | H04W 76/14 715/738 |
| 2014/0256256 A1* | 9/2014 | Park ....................... | H04W 36/14 455/41.1 |
| 2014/0273849 A1* | 9/2014 | Lee ........................ | G06F 1/1694 455/41.2 |
| 2015/0133054 A1* | 5/2015 | Chen .................... | H04W 74/002 455/41.2 |
| 2015/0245164 A1* | 8/2015 | Merrill ..................... | H04W 4/06 370/329 |
| 2015/0264139 A1* | 9/2015 | Son ........................ | H04L 67/125 709/208 |
| 2015/0334523 A1* | 11/2015 | Lappetelainen ........ | H04W 4/80 455/456.1 |
| 2016/0231325 A1* | 8/2016 | Kang ................ | A61B 5/150022 |
| 2017/0347333 A1* | 11/2017 | Skaaksrud ............. | H04W 12/06 |
| 2017/0364672 A9* | 12/2017 | Lee .......................... | G06F 21/35 |

FOREIGN PATENT DOCUMENTS

| | | |
|---|---|---|
| CN | 102882637 A | 1/2013 |
| EP | 1837814 A1 | 9/2007 |
| EP | 2260910 A1 | 12/2010 |
| EP | 2404548 A1 | 1/2012 |
| WO | 2012045483 A1 | 4/2012 |
| WO | 2013048511 A1 | 4/2013 |
| WO | 2013066499 A2 | 5/2013 |

OTHER PUBLICATIONS

Mikhail Galeev: EE Times-India—eetindia A primer on Bluetooth Low Energy (Part 1), Aug. 8, 2011 (Aug. 8, 2011 , pp. 1-3, XP55118824, Retrieved from the Internet: URL: http://www.eetindia.co.in/STATIC/PDF/201108/EEIOL_2011AUG08_RFD_TA_01.pdf?SOURCES=DOWNLOAD [retrieved from on May 20, 2014] BLEnuts and bolts, p. 3, lines 45-49.

International Search Report of International Application No. PCT/EP2014/054613 dated May 30, 2014.

* cited by examiner

METHODS FOR COMMUNICATING SENSOR DATA BETWEEN DEVICES

The present application is the National Stage of International Application No. PCT/EP2014/054613, filed Mar. 10, 2014 and designating the United States, which claims benefit to United Kingdom Patent Application 1304219.7 filed on Mar. 8, 2013. The entire content of these applications are incorporated herein by reference.

FIELD OF THE INVENTION

This invention relates to methods and apparatus for communicating sensor data between two devices in a manner that reduces the amount of power required for the data transmission. Illustrative embodiments of the invention relate to portable training devices, e.g. devices for monitoring athletic performance that can be worn by runners, cyclists, etc, which can track and record the position and/or pace of the user at particular moments during a workout and/or the distance covered by the user during the workout.

BACKGROUND OF THE INVENTION

It is well known to establish wireless communication channels between two devices in order to transfer data between the devices. For example, a Bluetooth protocol may be used to transfer data between two devices that are relatively close to each other. According to Bluetooth protocols, when it is desired to transfer data from a first device to a second device the first device is operated in an advertising state. In this state, the first device broadcasts advertising channel packets that indicate that the first device has data to transfer to another device. The second device is operated in a scanning state so as to listen for advertising channel packets from other devices. When the second device receives an advertising channel packet from the first device, then the second device will ultimately send a connection request message to the first device in order to set up a bi-directional data connection between the two devices. A data connection is formed by the transceivers of the two devices being tuned to the same frequency channel at the same time. The data may then be transferred from the first device to the second device through the data connection Such communication protocols, particularly the Bluetooth Low Energy (BLE) protocol, which is part of the Bluetooth v 4.0 protocol, require a relatively small amount of power to transfer data. However, it is still desired to provide data communication between devices using techniques that use even lower amounts of power. This is particularly the case in mobile devices, which tend to have relatively low capacity batteries due to size restrictions and which are becoming more power hungry as they are increasing in functionality. Even if a relatively small amount of data is required to be transferred between the devices, the power usage by conventional communication techniques may be considered excessive in some applications.

By way of example, in recent years global navigation satellite systems, e.g. GPS, devices have started to be used for pedestrian and outdoor applications. For example, fitness watches that include GPS receivers have started to be used by joggers, runners, cyclists and other athletes and outdoor enthusiasts as a means to obtain real-time data of their speed, distance travelled, etc. It may be desirable during group activities to transfer data from one person's fitness watch to another person's fitness watch. For example, it may be desirable during a competition for each competitors watch to transfer data regarding their position to the other competitors' watches so that each competitors watch is able to display their location relative to that of the other competitors. However, fitness watches are relatively power hungry due in part to the GPS receivers contain therein, and such data transfers only serve to drain the batteries even faster. Fitness watches only contain relatively low capacity batteries as they are desired to be small and light devices. As such, the above-described data communication with other fitness watches may be seen as prohibitive as it would reduce the length of the battery life between recharges.

Another problem with some conventional communication techniques such as Bluetooth devices is that the Bluetooth chip is typically only able to establish a few data connection channels at any given time. If all of such data channels are already in use then it has conventionally been considered not possible to transfer data to or from that device. For example, a conventional fitness watch may have established a Bluetooth connection with a heart rate monitor and a foot pod sensor, thereby occupying all of its data channels and leaving no data channels for transferring other data to or from the fitness watch.

It is desired to provide an improved method and devices for communicating data from a sensor between two devices.

SUMMARY OF THE INVENTION

The present invention provides a method of wirelessly transmitting sensor data between devices, comprising:
  providing a first device having data therein received from at least one sensor;
  operating the first device in an advertising state so as to wirelessly broadcast data packets, wherein each data packet includes an identifier for identifying the first device and also includes said data from the at least one sensor; and
  operating a second device in a scanning state in which the second device scans for data packets broadcast by other devices, wherein the second device:
    receives a data packet from the first device;
    determines the identity of the first device from said identifier;
    extracts the sensor data; and
    provides an output that indicates the identity of the first device and the sensor data associated with the first device.

As the present invention comprises broadcasting (advertising) data packets containing a device identifier and sensor data and comprises scanning for such data packets, the present invention enables the first device to transfer the sensor data to the second device without the first device being required to detect the second device in advance; or without the first and second devices having established a data connection by being tuned to the same frequency channel at the same time. The inventors have recognised that sensor data can be transmitted between devices without the need to establish a data connection between the two devices (i.e. without the transceivers of both devices being tuned to the same frequency channel at the same time) and that sensor data can therefore be transferred in a less power intensive manner. More specifically, the inventors have recognised that sensor data tends to be relatively small and it may only be necessary to transfer sensor data to other devices at periodic and infrequent intervals, and that the sensor data can therefore be transmitted in the broadcast data packets rather than over a data connection. The present invention also overcomes the problem of transferring sensor data to a device that already has all of its data connection channels occupied, because the data transfers according to the present invention do not require a data connection channel to be established.

The first device may broadcast said advertising data packets, and said second device may scan and receive said data packets, using a Bluetooth protocol, optionally the Bluetooth Low Energy (BLE) protocol (which as discussed above is a feature of the Bluetooth version 4.0 protocol). Preferably, said data packets are Bluetooth advertising channel packets and the first device adds the identifier and sensor data to the Bluetooth advertising channel packets. The sensor data may be added to the Protocol Data Unit (PDU) portion of the advertising channel packet. Such advertising channel packets have not been used before to transfer data such as sensor data, as their conventional function is to help set up a data connection over which such sensor data would subsequently be transferred. In contrast to conventional techniques, the preferred method adds the sensor data to the Bluetooth advertising channel packets and is therefore able to transfer the sensor data to another device before and without the two devices even setting up a data connection.

When the second device receives an advertising channel packet from the first device it may be prompted to broadcast a scanning request message to the first device, wherein the scanning request message includes an identifier for identifying the second device, and optionally an identifier for the identifying the first device.

The scanning request message may further include sensor information from at least one sensor associated with the second device; if such information can be added to the message according to the wireless communication protocol being used. When the first device receives such a scanning request message it may determine the identity of the second device from the identifier, extract the sensor data related to the second device, and provide an output that indicates the identity of the second device and the sensor data associated with the second device.

Alternatively, or additionally, when the first device receives the scanning request message from the second device (with or without any sensor information) it is prompted to broadcast a scanning response message including the identifier of the first device and sensor data from the first device. The second device may then receive the scanning response message from the first device, determine the identity of the first device from said identifier, extract the sensor data, and provide an output that indicates the identity of the first device and the sensor data associated with the first device. The sensor data sent in the scanning response message may be updated sensor data corresponding to the sensor data that had previously been broadcast from the first device in the advertising channel packet; or it may be additional sensor data of a different kind to that broadcast previously.

As mentioned above, the present invention enables data to be transferred to or from a device even when that device already has all of its data connection channels assigned for other uses. Accordingly, during transfer of the sensor data, the first and/or second device may have established one or more data connection with other sensors, e.g. via Bluetooth data channels. For example, the first and/or second device may be a personal training device and the other sensors may be one or more of a heart rate monitor, a foot pod sensor (e.g. a micro-electromechanical systems (MEMS) sensor typically attached to a shoe for use in determining running cadence and the like), a bicycle cadence sensor, or the like. The present invention enables the sensor data to be transferred to or from the device even though its data connection channels are already been used to connect with other sensors or devices.

At least one sensor is provided in said first device or in communication with said first device, and the method comprises obtaining said sensor data with said at least one sensor and providing said sensor data in said first device. The at least one sensor associated with the first device is preferably integral with the first device, although the at least one sensor may transmit the sensor data to the first device via wireless communication, e.g. by using a Bluetooth communication channel.

The at least one sensor may obtain sensor data relating to any one, or any combination of two or more, of the following properties of the sensor: location (e.g. from a GNSS receiver, such as in the form of a latitude-longitude coordinate pair, or from any other suitable location determining means); speed (e.g. from a GNSS receiver, or any other suitable speed determining means), the speed may be indicative of a current speed or an average speed for the workout; heart rate or another indicator of physical exertion during a workout; orientation; acceleration; and altitude. Preferably, the first device adds the sensor data received most recently from the at least one sensor into one of said data packets and then broadcasts the data packet. The first device is therefore able to broadcast the most up to date sensor data available.

When the second device receives one of the data packets from the first device, the second device may display an icon representing the first device together with information representing the sensor data received from said first device. Each time the second device receives a new data packet from the first device that contains different sensor data, said information may be updated with new information representing the sensor data received from said first device.

The second device is preferably also associated with one or more sensors for obtaining sensor data related to the second device, and the second device displays an icon representing the second device together with information representing the sensor data associated with the second device. The information representing the sensor data associated with the second device is preferably periodically updated with new information from the sensor associated with the second device. The sensor data relating to the first and second devices may be any one, or any combination of any two or more of: location; speed; heart rate or another indicator of physical exertion during a workout; orientation; acceleration; and altitude; and the second device may display the sensor data associated with both the first and second devices. The second device may display the location, speed, orientation, or altitude of the first device relative to the location, speed, orientation, or altitude of the second device, respectively. Alternatively, or additionally, the second device may display the distance or relative speed difference between the first and second devices based on the sensor data.

The second device may include a speaker and when the second device receives one of the data packets from the first device, the second device may sound an alarm or sound information representing the sensor data received from said first device.

The second device may be configured or configurable to only process data packets from selected or predefined types of device, or from selected or predefined individual device identities, so as to only extract said sensor data that is broadcast by said predefined or selected types of device or by said predefined or selected device identities. The second device may be configured to enable said selected types of device to be modified by a user of the second device.

Transferring data from the first device to the second device has been described above. However, the second device may transfer data to the first device in a corresponding manner to that described above. Accordingly, the method may comprise operating the second device in an advertising state so as to wirelessly (and periodically) broadcast second data packets, wherein each second data packet includes an identifier for identifying the second device and also includes sensor data obtained from at least one sensor associated with the second device; and operating the first device in a scanning state in which the first device scans for data packets broadcast from other devices, wherein the first device: receives a data packet from the second device; determines the identity of the second device from the identifier sent by the second device; extracts the sensor data sent by the second device; and provides an output that indicates the identity of the second device and the sensor data associated with the second device.

The second device transfers the sensor data to the first device in said second data packets without the second device being required to detect the first device in advance; or without the first and second devices having established a data connection by being tuned to the same frequency channel at the same time.

The second device preferably broadcasts said second data packets and the first device scans and receives said second data packets using a Bluetooth protocol, optionally the Bluetooth Low Energy protocol. The second data packets are preferably Bluetooth advertising channel packets and the second device preferably adds the identifier and sensor data associated with the second device to these Bluetooth advertising channel packets. The sensor data from the second device may be added to the Protocol Data Unit (PDU) portion of the advertising channel packet.

When the first device receives an advertising channel packet from the second device it may be prompted to broadcast a scanning request message, wherein the scanning request message includes an identifier for identifying the first device, and optionally an identifier for identifying the second device.

The scanning request message may further include sensor information from the at least one sensor associated with the first device; if such information can be added to the message according to the wireless communication protocol being used. When the second device receives such a scanning request message it may determine the identity of the first device from the identifier, extract the sensor data related to the first device, and provide an output that indicates the identity of the first device and the sensor data associated with the first device.

Alternatively, or additionally, when the second device receives the scanning request message from the first device (with or without any sensor information) it is prompted to broadcast a scanning response message including the identifier of the second device and sensor data of the second device. The first device may then receive the scanning response message from the second device, determine the identity of the second device from said identifier, extract the sensor data, and provide an output that indicates the identity of the second device and the sensor data associated with the second device.

The method preferably comprises obtaining the sensor data associated with said second device using said at least one sensor associated with the second device and providing said second sensor data in said second device. The at least one sensor is preferably integral with the second device.

The at least one sensor associated with the second device may obtain sensor data relating to any one, or any combination of two or more, of the following properties of the sensor: location (e.g. from a GNSS receiver, such as in the form of a latitude-longitude coordinate pair, or from any other suitable location determining means); speed (e.g. from a GNSS receiver, or any other suitable speed determining means), the speed may be indicative of a current speed or an average speed for the workout; heart rate or another indicator of physical exertion during a workout; orientation; acceleration; and altitude.

The second device preferably adds the sensor data received most recently from the at least one sensor associated with the second device into one of said second data packets and then broadcasts the data packet. When the first device receives one of the second data packets from the second device, the first device may display an icon representing the second device together with information representing said second sensor data received from said second device. Each time the first device receives a new data packet from the second device that contains different sensor data, said information is preferably updated with new information representing said different sensor data received from said second device.

The first device may display an icon representing the first device together with information representing the sensor data from the at least one sensor associated with the first device. Information representing the sensor data associated with the first device is preferably periodically updated with new information from the at least one sensor associated with the first device.

The sensor data relating to the first and second devices may be any one, or any combination of any two or more of: location; speed; heart rate or another indicator of physical exertion during a workout; orientation; acceleration; and altitude; and the first device may display the sensor data from the first and second devices. The first device may display the location, speed, orientation, or altitude of the second device relative to the location, speed, orientation, or altitude of the first device, respectively. Alternatively, or additionally, the first device may display the distance or relative speed difference between the first and second devices based on the sensor data.

The first device may include a speaker and when the first device receives one of the second data packets from the second device, the first device may sound an alarm or sound information representing the sensor data received from said second device.

The first device may be configured or configurable to only process data packets from selected or predefined types of device, or from selected or predefined individual device identities, so as to only extract said sensor data that is broadcast by said predefined or selected types of device or by said predefined or selected device identities. The first device may be configured to enable said selected types of device to be modified by a user of the first device.

The method may further comprise providing a third device; operating the third device in an advertising state so as to wirelessly (and periodically) broadcast data packets, wherein each data packet includes an identifier for identifying the third device and also includes sensor data obtained from at least one sensor associated with the third device; and operating the first and/or second device in a scanning state in which the first and/or second device respectively scans for data packets broadcast from other devices; wherein the first and/or second device receives a data packet from the third device, determines the identity of the third device from the identifier sent by the third device, extracts the sensor data sent by the third device, and provides an output that indicates the identity of the third device and the sensor data associated with the third device.

The method may comprise providing a or the third device; operating the first and/or second device in an advertising state so as to periodically and wirelessly broadcast data packets, wherein each data packet includes an identifier for identifying the first and/or second device respectively and also includes sensor data obtained from at least one sensor associated with the first and/or second device respectively; and operating the third device in a scanning state in which the third device scans for data packets broadcast from other devices; wherein the third device receives a data packet from the first and/or second device, determines the identity of the first and/or second device respectively from the identifier sent by the first and/or second device, extracts the sensor data sent by the first and/or second device, and provides an output that indicates the identity of the first and/or second device and the sensor data associated with the first and/or second device.

The third device may operate in a corresponding manner and perform corresponding functions to the first and/or second devices described above. Fourth or further devices may also be provided that operate in a corresponding manner to the first and/or second and/or third devices.

The sensor data may be location data and each device may indicate the location of the other device(s). Each device may have a compass style screen that shows the relative positions of all of the other devices that have been detected (i.e. from which advertising channel packets have been processed). The location of each device may be indicated by a unique icon, which may be chosen by the users of the respective devices and transferred along with the sensor data from those devices. The display of any given device may show the location of the other devices relative to a compass direction on said given device such that the direction or the location of the other devices can be determined by the user of the device no matter what angle the device is viewed from. A device's own location may always be displayed at a predetermined point or by its own unique icon. The distance on the display from this point or icon of the icons for the other detected devices may be proportional to the actual distance to the other devices. The device may only indicate other devices that are detected to be within a predetermined distance. Alternatively, devices that are detected to be at a distance greater than the predetermined distance may be indicated by icons at the maximum distance on the display, e.g. at a point on a ring at the edge of the display.

Alternatively, any given device may be configured such that a user can select one of the other detected devices to remain at a predetermined location on the display and for said given device to show its own location as moving relative to the predetermined location when said given device moves relative to the other detected device.

Each device receives the identities and sensor data from other devices. Each device may be configured to transfer the identities and sensor data received from the other devices when it transfers its own identity and sensor data to another device or other devices (and preferably in the same data transfer manner). As such, the devices are able to receive the identities and sensor data from other devices that are outside of their own range, since provided that the ranges of the devices overlap, this information will be retransmitted along the chain of devices. This serves to increase the range of the network, without requiring high power transceivers.

If other devices are not detected for a predetermined length of time then the icons for these devices may be removed from the display or may be indicated as not having been detected for the predetermined length of time, e.g. by being shown as a faded icon.

Each device may be configured such that the user can select an icon for another device and determine data regarding the other device. For example, the user may be able to determine more information about the identity of the user of the other device, such as their full name, or further details regarding their location. Such additional data may be received by the device in the same manner as the sensor data. Alternatively, or additionally, the device may indicate more details of the last known location and/or last time at which the other device was detected.

The first and/or second and/or third and/or further devices described herein are preferably portable devices, optionally handheld devices or devices to be carried or worn by a person. Most preferably, the devices are personal training devices, such as sports watches.

It is believed that each of the first and second devices used in the inventive method are inventive in their own right.

Accordingly, in another aspect of the present invention there is provided a portable transmitter device for transmitting data, comprising:

at least one sensor for obtaining sensor data;
a processor; and
a transmitter,
wherein the transmitter device is configured to operate in an advertising state, wherein the processor periodically and repeatedly performs the following cycle of steps: obtains data from said sensor, assembles said data into a data packet along with an identifier for identifying the transmitter device, and controls the transmitter to wirelessly broadcast said data packet.

The transmitter device may be configured so as to have or perform any one or combination of the features described above in relation to the first or second device.

For example, the transmitter device may be configured to transfer the sensor data in the data packets to another device without being required to detect said another device in advance; or without having to establish a data connection with said another device by being tuned to the same frequency channel at the same time.

The transmitter device is preferably configured to broadcast the data packets using a Bluetooth protocol, optionally the Bluetooth Low Energy protocol. The data packets are preferably Bluetooth advertising channel packets and the transmitter device is configured to add the identifier and sensor data to the Bluetooth advertising channel packets. Preferably, the transmitter device is configured such that the sensor data is added to the Protocol Data Unit (PDU) portion of the advertising channel packet.

The at least one sensor may be configured to provide sensor data relating to any one, or any combination of two or more, of the following properties of the sensor: location; speed; heart rate or another indicator of physical exertion during a workout; orientation; acceleration; and altitude. The processor is preferably configured to control the transmitter device so that the sensor data received most recently from the at least one sensor is added into one of said data packets and then the data packet is broadcast.

The transmitter device may be configured to display an icon representing the transmitter device together with information representing the sensor data. The controller is preferably configured such that information representing the sensor data is periodically updated with new information from the sensor.

The device preferably comprises a receiver and audio and/or visual output means (e.g. a display device, such as a LCD display); wherein the device is configured to operate in a scanning state, and wherein the processor uses the receiver to scan for second data packets broadcast by other devices, and wherein the transmitter device is configured such that when it receives a second data packet from another device, the processor seeks to determine the identity of the other device from the received second data packet, seeks to extract sensor data from the received data packet, and controls the output means to indicates the identity of the other device and the sensor data associated with the other device.

The transmitter device is preferably configured to scan and receive said second data packets using a Bluetooth protocol, optionally the Bluetooth Low Energy protocol. The transmitter device is preferably configured to extract the identity of the other device and the sensor data from advertising data packets that are received.

The transmitter device may be configured such that when it receives one of the second data packets from the other device, the transmitter device displays an icon representing the other device together with information representing at least part of said sensor data received from said other device. The transmitter device is preferably configured such that each time it receives a new data packet from the other device that contains different sensor data, said information is updated with new information representing at least part of said sensor data received from said other device.

The sensor data relating to the transmitter device and other device may be any one, or any combination of any two or more of: location; speed; heart rate or another indicator of physical exertion during a workout; orientation; acceleration; and altitude; and the transmitter device may display the sensor data associated with the transmitter device and other device. The transmitter device may be configured to display the location, speed, orientation, or altitude of the transmitter device relative to the location, speed, orientation, or altitude of the other device, respectively; or the transmitter device may display the distance or relative speed difference between the transmitter device and other device.

The transmitter device may include a speaker and the transmitter device may be configured such that when it receives one of the data packets from the other device, the transmitter device sounds an alarm or sounds information representing the sensor data received from said other device.

The transmitter device may be configured or configurable to only process data packets from selected or predefined types of device, or from selected or predefined individual device identities, so as to only extract sensor data that is broadcast by said predefined or selected types of device or by said predefined or selected device identities. The transmitter device may be configured to enable said selected types of device to be modified by a user of the transmitter device.

The transmitter device is preferably a portable device, preferably a handheld device or a device to be carried or worn by a person. The device is preferably a personal training device such as a sports watch.

In another aspect of the present invention there is provided a portable receiver device for receiving data, comprising:

a receiver; and
a processor,
wherein the receiver device is configured to operate in a scanning state in which the processor controls the device to use the receiver to scan for data packets broadcast by other devices, and wherein the device is configured such that when it receives a data packet from another device the processor seeks to determine the identity of the other device from the received data packet, seeks to extract sensor data from the received data packet, and wherein the receiver device is configured to provide an output that indicates the identity of the other device and the sensor data associated with the other device.

The receiver device may be configured so as to have or perform any one or combination of the features described above in relation to the first or second device.

For example, the receiver device may be configured to scan and receive said data packets using a Bluetooth protocol, optionally the Bluetooth Low Energy protocol, wherein the receiver device is configured such that the processor seeks to extract said identifier and sensor data from Bluetooth advertising channel packets. The receiver device is preferably configured such that the processor seeks to extract the sensor data from the Protocol Data Unit (PDU) portion of the advertising channel packet.

The receiver device may be configured to display an icon representing the other device together with information representing said sensor data received from said other device. The receiver device is preferably configured such that each time the device receives a new data packet from the other device containing different sensor data, said information is updated with new information representing said different sensor data.

The receiver device preferably comprises at least one sensor for obtaining sensor data, and wherein the receiver device is configured to display an icon representing the receiver device together with information representing the sensor data associated with the receiver device. The receiver device may be configured such that information representing the sensor data associated with the receiver device is periodically updated with new information from the sensor of the receiver device.

The sensor data relating to the receiver device and the other device may be any one, or any combination of any two or more of: location; speed; heart rate or another indicator of physical exertion during a workout; orientation; acceleration; and altitude; and wherein the receiver device displays the sensor data from the receiver device and the other device. The receiver device may be configured so as to display the location, speed, orientation, or altitude of the receiver device relative to the location, speed, orientation, or altitude of the other device, respectively; or wherein the receiver device displays the distance between the receiver device and other device.

The receiver device may includes a speaker and wherein when the receiver device receives one of the data packets from the other device, the receiver device may sound an alarm or sound information representing the sensor data received from said other device.

The receiver device may be configured or configurable to only process data packets from selected or predefined types of device, or from selected or predefined individual device identities, so as to only extract said sensor data that is broadcast by said predefined or selected types of device or by said predefined or selected device identities. The receiver device may be configured to enable said selected types of device to be modified by a user of the receiver device.

The receiver device is preferably a portable device, preferably a handheld device or a device to be carried or worn by a person. The receiver device is most preferably a personal training device such as a sports watch.

As will be appreciated, the present invention also extends to a transceiver device capable of operating in the manner of both the transmitter device and the receiver device described above. In such a transceiver device, the device comprises a transceiver, such as a Bluetooth device, configured to wirelessly transmit and receive data.

The present invention also provides a system comprising a transmitter device as described above and a receiver device as described above. Each of the transmitter and receiver devices in this system may be configured perform the methods of wirelessly transmitting data that have been described herein above and in which the transmitter device is said first device and said receiver device is said second device.

As described above, each of the first, second, third, further, transmitter and receiver devices of the present invention is preferably a mobile or portable device that can be carried by a user as he or she travels from one location to another. Some general features that apply to each of the devices will now be described.

The mobile device can be arranged so as to be carried by the user, such as being attached to the user's arm or wrist, or simply by being placed in a pocket or other suitable receptacle (e.g. a specially designed holder or case). Alternatively, the mobile device can be arranged so as to be transported. For example, the mobile device can be attached to a vehicle being used by the user, e.g. a bicycle, canoe, kayak or other similar vehicle. The mobile device could also be attached to an object being pushed or pulled by a user, such as a child-carrying buggy. Such mobile devices are commonly referred to as portable personal training devices.

The device comprises means for tracking the location of the user as he or she moves from one location to another. The location determining means can comprise any suitable device as desired. For example, latitude and longitude coordinates can be determined using devices that can access and receive information from WiFi access points or cellular communication networks. Preferably, however, the location determining means comprises a global navigation satellite systems (GNSS) receiver, such as a GPS receiver, for receiving satellite signals indicating the position (and optionally speed) of the receiver (and thus user) at a particular point in time, and which receives updated position (and optionally speed) information at regular intervals.

Preferably, the GNSS receiver comprises a patch antenna or helical antenna, but it may comprise any other type of antenna capable of receiving satellite signals. The antenna is preferably at least partially encased or contained within a housing of the mobile device.

In a preferred embodiment, new location information, i.e. the geographic location of the device, is received at a rate of 0.5 Hz or greater, preferably at a rate of 1 Hz or greater, such as up to a rate of 20 Hz. As known in the art, the location information comprises at least longitude and latitude, and preferably also includes elevation.

The device may further have access to data from one or more external motion sensors, e.g. for detecting motion of the user. For example, the device may comprise communication means for at least receiving data from a foot pod sensor (worn by the user). The foot pod sensor, as known in the art, may comprise a MEMS or piezoelectric sensor (accelerometer), e.g. that is positioned in the sole of the user's shoe and detects each time the shoe strikes the ground.

As discussed above, the mobile device can be configured so as to be carried or transported by a user. The housing of the mobile device may comprise a strap for securing the housing to a user. The strap, for example, can be arranged to secure the housing to the users wrist in the manner of a watch. In other words, the mobile device is preferably a sports watch.

The mobile device preferably comprises a display for providing information to the user, such as information as obtained or derived from the location determining means, e.g. distance travelled, current speed, average speed, elevation, etc. The display may also display the identity and sensor data from other devices, as described above. The display screen can include any type of display screen, such as an LCD display, e.g. that can display both text and graphical information.

The mobile device preferably comprises one or more input means to allow the user to select one or more functions of the device and/or to input information to the device, such as to display particular information on the display. The input means can comprise one or more buttons, switches or the like attached to the housing, a touch panel and/or any other suitable device. For example, the housing could be arranged to be touch sensitive such that the user can input information, request a change in the information being displayed, etc by touching appropriate portions of the housing. The input means and the display could be integrated into an integrated input and display device, including a touchpad or touchscreen input so that a user need only touch a portion of the display to select one of a plurality of display choices or to activate a virtual button or buttons. The input means may additionally or alternatively comprise a microphone and software for receiving input voice commands as well.

The mobile device may include an audible output device, such as a loudspeaker, for providing audible information, such as instructions, alerts, etc, to a user. For example, the output device can provide an indication when a target distance has been travelled and/or when a target speed has been achieved.

In a preferred embodiment of the present invention, the mobile device comprises data storage means, e.g. for storing one or more locations received from the location determining means. The data storage means can comprise memory, such as volatile or non-volatile memory, which may be integral with the location determining means. Alternatively, the data storage means can be removable.

As will be appreciated, the mobile device will comprise a power source, e.g. for providing power to the various components and sensors of the device. The power source can take any suitable form, although in a preferred embodiment, the power source comprises a rechargeable battery, e.g. that can be recharged when the aforementioned data connector is inserted into a port on a computer or other suitable device. In other words, the data connector preferably comprises a power and data connector.

The methods in accordance with the present invention may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

Like reference numerals are used for the like features throughout the drawings.

DETAILED DESCRIPTION OF THE PREFERRED EMBODIMENTS

Preferred embodiments of the present invention will now be described with particular reference to a fitness or sports watch having access to Global Positioning System (GPS) data. Fitness or sports watches of the type described are often worn by athletes to help them during their runs or workouts, e.g. by monitoring the speed and distance of the user and providing this information to the user. It will be appreciated, however, that the device could be arranged to be carried by a user or connected or "docked" in a known manner to a vehicle such as a bicycle, kayak, or the like.

Figure 1:
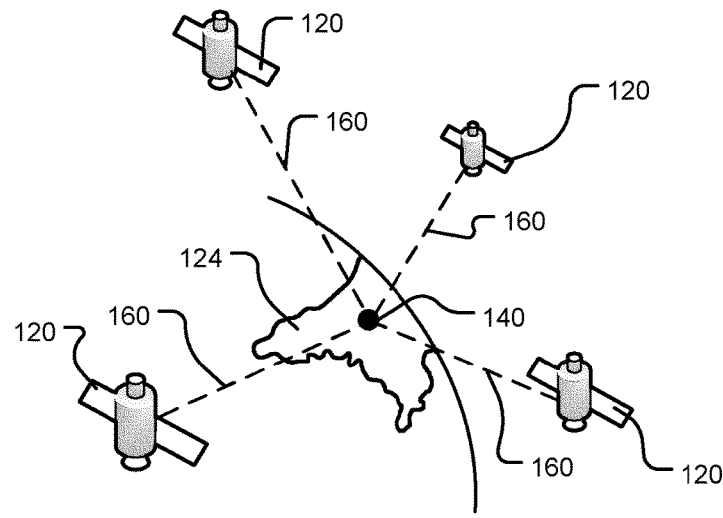
FIG. 1 is a schematic illustration of a Global Positioning System (GPS)

FIG. 1 illustrates an example view of Global Positioning System (GPS), usable by such devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
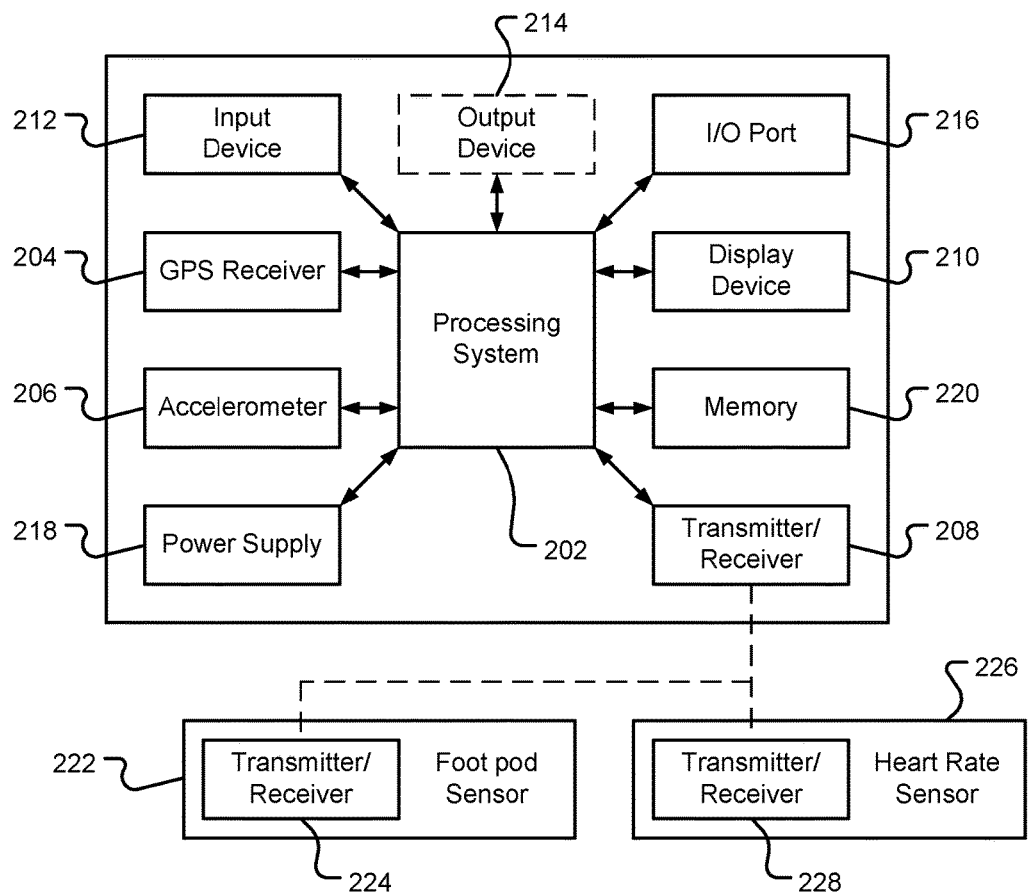
FIG. 2 is a schematic illustration of electronic components arranged to provide a portable personal training device.

FIG. 2 is an illustrative representation of electronic components of a sports watch 200 according to a preferred embodiment of the present invention, in block component format. It should be noted that the block diagram of the device 200 is not inclusive of all components of the device, but is only representative of many example components.

The device 200 includes a processor 202 connected to an input device 212, such as a depressible touchpad (or trackpad), and a display screen 210, such as an LCD display. The device 200 can further include an output device arranged to provide audible information to a user, such as alerts that a certain speed has been reached or a certain distance has been travelled.

FIG. 2 further illustrates an operative connection between the processor 202 and a GPS antenna/receiver 204. Although the antenna and receiver are combined schematically for illustration, the antenna and receiver may be separately located components. The antenna may be of any suitable form, but in preferred embodiments is a GPS patch antenna.

The device 200 further includes an accelerometer 206, which can be a 3-axis accelerometer arranged to detect accelerations of the user in x, y and z directions. The accelerometer may act as a pedometer for use when/if there is a loss of GPS reception, and/or may act to detect stroke rate when the fitness watch is being used during swimming. Although the accelerometer is shown to be located within the device, the accelerometer may also be a external sensor worn or carried by the user, and which transmits data to the device 200 via the transmitter/receiver 208.

The device may also receive data from other sensors, such as a foot pod sensor 222 or a heart rate sensor 226. The foot pod sensor may, for example, be a piezoelectric or micro-electro-mechanical systems (MEMS) accelerometer that is located in or on the sole of the user's shoe. Each external sensor is provided with a transmitter and receiver, 224 and 228 respectively, which can be used to send or receiver data to the device 200 via the transmitter/receiver 208.

The processor 202 is operatively coupled to a memory 220. The memory resource 220 may comprise, for example, a volatile memory, such as a Random Access Memory (RAM), and/or a non-volatile memory, for example a digital memory, such as a flash memory. The memory resource 220 may be removable. As discussed in more detail below, the memory resource 220 is also operatively coupled to the GPS receiver 204, the accelerometer 206 and the transmitter/receiver 208 for storing data obtained from these sensors and devices.

Further, it will be understood by one of ordinary skill in the art that the electronic components shown in FIG. 2 are powered by a power source 218 in a conventional manner. The power source 218 may be a rechargeable battery.

The device 200 further includes an input/output (I/O) device 216, such as a plurality of electrical contacts or a USB connector. The I/O device 216 is operatively coupled to the processor, and also at least to the memory 220 and power supply 218. The I/O device 216 is used, for example, to: update firmware of processor 220, sensors, etc; transfer data stored on the memory 220 to an external computing resource, such as a personal computer or a remote server; and recharge the power supply 218 of the device 200. Data could, in other embodiments, also be sent or received by the device 200 over the air using any suitable mobile telecommunication means.

As will be understood by one of ordinary skill in the art, different configurations of the components shown in FIG. 2 are considered to be within the scope of the present application. For example, the components shown in FIG. 2 may be in communication with one another via wired and/or wireless connections and the like.

Figure 3:
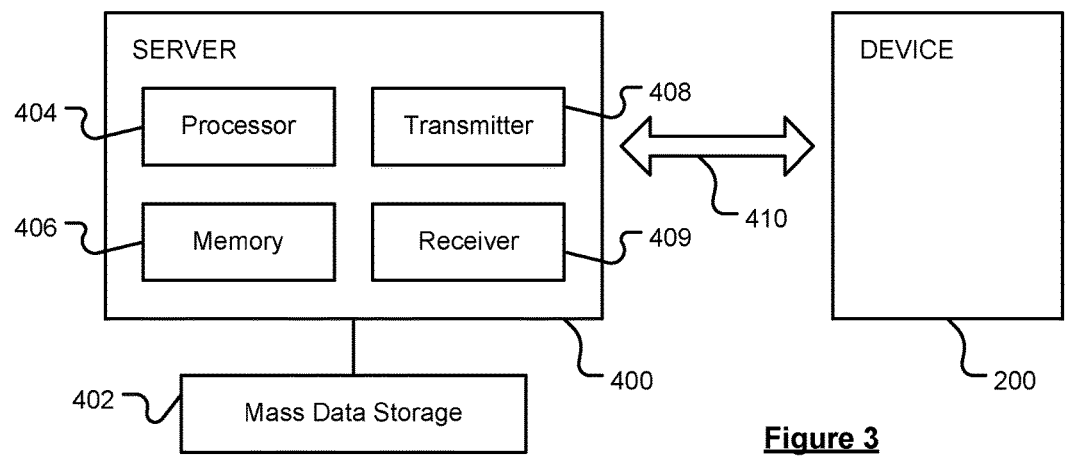
FIG. 3 is a schematic illustration of the manner in which a portable personal training device may receive information over a wireless communication channel.

In FIG. 3 the watch 200 is depicted as being in communication with a server 400 via a generic communications channel 410 that can be implemented by any number of different arrangements. The server 400 and device 200 can communicate when a connection is established between the server 400 and the watch 200 (noting that such a connection can be a data connection via mobile device, a direct connection via personal computer via the internet, etc.).

The server 400 includes, in addition to other components which may not be illustrated, a processor 404 operatively connected to a memory 406 and further operatively connected, via a wired or wireless connection, to a mass data storage device 402. The processor 404 is further operatively connected to transmitter 408 and receiver 409, to transmit and send information to and from device 200 via communications channel 410. The signals sent and received may include data, communication, and/or other propagated signals. The functions of transmitter 408 and receiver 409 may be combined into a signal transceiver.

The communication channel 410 is not limited to a particular communication technology. Additionally, the communication channel 410 is not limited to a single communication technology; that is, the channel 410 may include several communication links that use a variety of technology. For example, the communication channel 410 can be adapted to provide a path for electrical, optical, and/or electromagnetic communications, etc. As such, the communication channel 410 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 410 can include intermediate devices such as routers, repeaters, buffers, transmitters, and receivers, for example.

In one illustrative arrangement, the communication channel 410 includes telephone and computer networks. Furthermore, the communication channel 410 may be capable of accommodating wireless communication such as radio frequency, microwave frequency, infrared communication, etc. Additionally, the communication channel 410 can accommodate satellite communication.

The server 400 may be a remote server accessible by the watch 200 via a wireless channel. The server 400 may include a network server located on a local area network (LAN), wide area network (WAN), virtual private network (VPN), etc.

The server 400 may include a personal computer such as a desktop or laptop computer, and the communication channel 410 may be a cable connected between the personal computer and the watch 200. Alternatively, a personal computer may be connected between the watch 200 and the server 400 to establish an internet connection between the server 400 and the watch 200. Alternatively, a mobile telephone or other handheld device may establish a wireless connection to the internet, for connecting the watch 200 to the server 400 via the internet.

The server 400 is further connected to (or includes) a mass storage device 402. The mass storage device 402 contains a store of at least digital map information. This digital map information can be used, together with data from the device, such as time-stamped location data obtained form the GPS receiver 204 and data indicative of motion of the wearer obtained from the accelerometer 206, footpad sensor 222, etc, to determine a route travelled by the wearer of the device 200, which can then be viewed by the wearer.

As will be appreciated, the watch 200 is designed to be worn by a runner or other athlete as they undertake a run or other similar type of workout. The various sensors within the watch 200, such as the GPS receiver 204 and the accelerometer 206, collect data associated with this run, such as the distance travelled, current speed, etc, and display this data to the wearer using the display screen 210.

Figure 4:
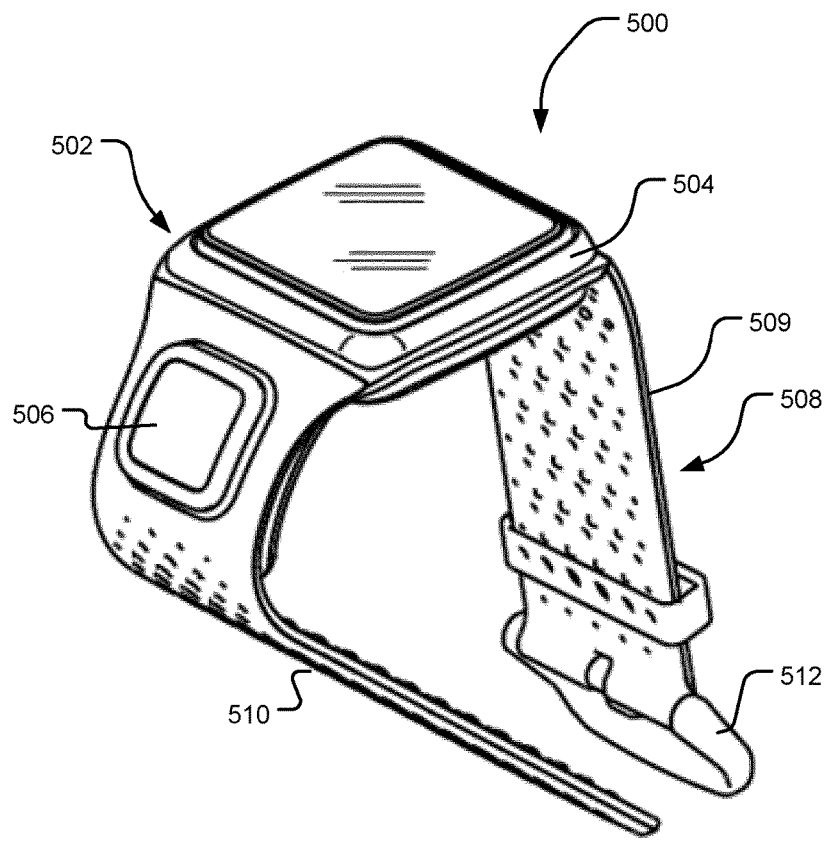
FIG. 4 shows a perspective view of an exemplary fitness watch casing positioned in a strap and arranged to operate in accordance with the present invention.
Figure 7:
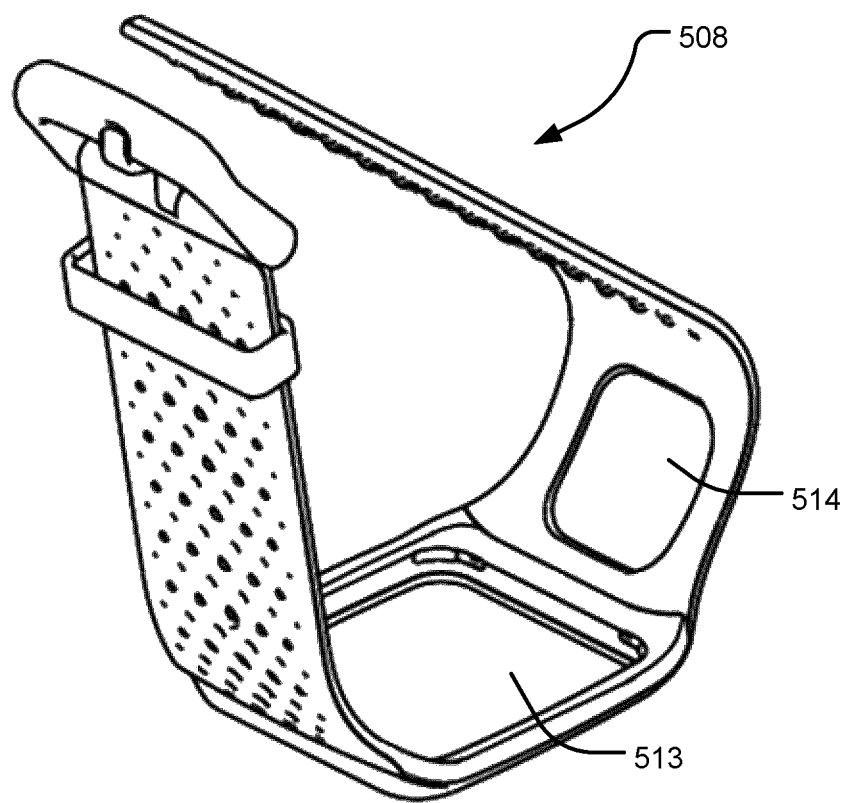
FIG. 7 shows the watch strap of FIG. 4 without the fitness watch casing.

FIG. 4 shows a perspective view of a fitness watch casing 502 according to a preferred embodiment of the present invention, which is in the form of a module that can be inserted into a plurality of different docking solutions. The watch casing 502 comprises a display housing 504 and a user interface 506, which are spaced apart from each other. In the embodiment depicted in FIG. 4 the watch casing 502 is inserted into apertures 513 and 514 in a strap 508 (as shown in FIG. 7); the strap being wearable on the wrist of a user to create a fitness watch 500. As will be appreciated, the user interface portion 506 of the watch casing 500 is arranged to pass through aperture 514, and the display housing portion 504 is arranged to pass through the aperture 513. The strap 508 is formed of two parts 509, 510 that connect to each other by a buckle 512, in the conventional way. Cooperating projections and recesses on the watch casing 500 and the strap 508, e.g. the projections 519 shown in FIG. 5, allow the watch casing 500 to releasably engage and be maintained in position within the strap 508.

Figure 5:
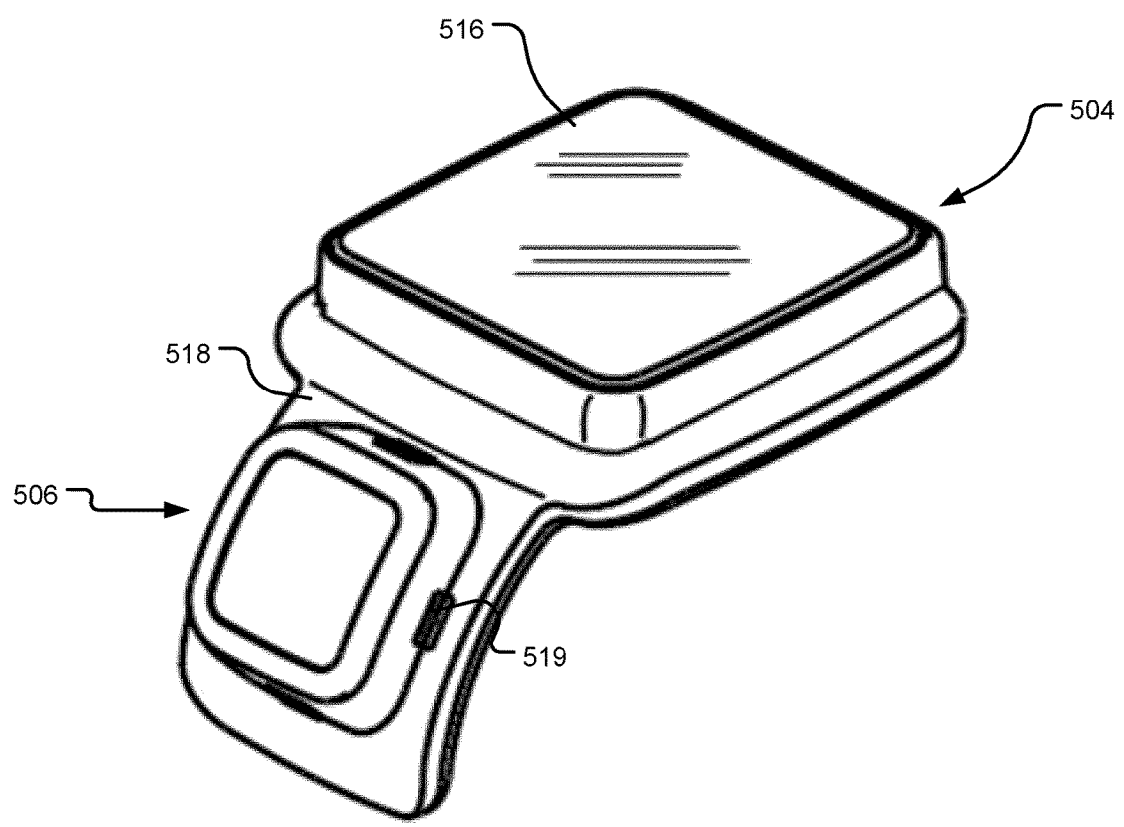
FIG. 5 shows the watch casing of FIG. 4.

FIG. 5 shows a perspective view of the watch casing 502, once the module has been disengaged from the strap 508. As described above, the casing 502 has a display housing 504 and a user interface 506 that is spaced apart from the display housing. The display housing portion 504 is of substantially parallelepiped construction and has a substantially planar display 516 for displaying information to the user. This portion of the watch sits on the back of the user's wrist in use. The user interface portion 506 is connected to the display housing 504 by a connecting portion 518. This connecting portion 518 can be seen as a flange that extends away from the display housing 504. The flange 518 curves as it extends away from the display housing 504 such that it curves around the side of the user's wrist in use. The user interface 506 is located on the flange 518 such that the user interface 506 is arranged on the side of the user's wrist in use. The user interface 506 has a substantially planar pressing surface for the user to interact with the watch 500. The user can thereby press the pressing surface in a direction perpendicular to the pressing surface so as to control the watch 500, e.g. to select desired functions within the menu system of the watch.

Figure 10:
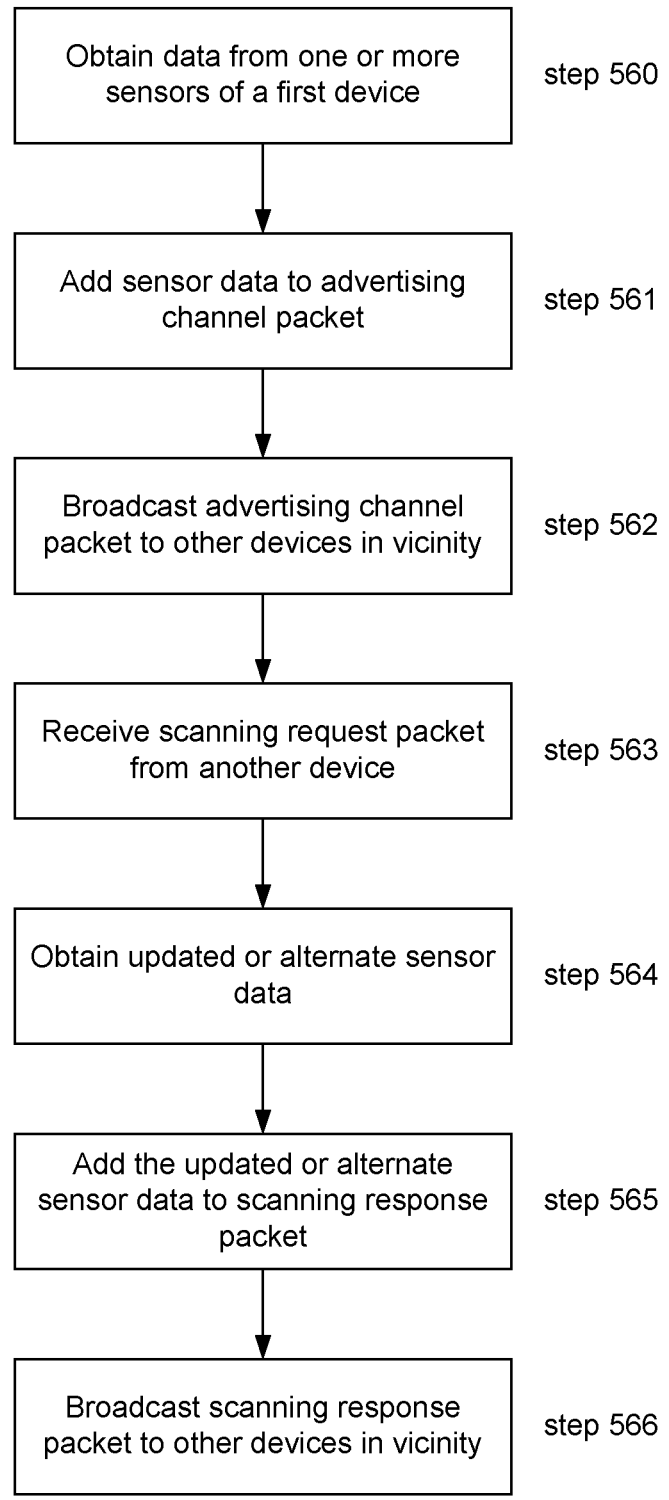
FIG. 10 is a flow diagram depicting the steps performed by a portable transmitter device when operating in accordance with the preferred method.

The location of the user interface 506 being arranged on the curved flange 518 such that it sits against the side of the user's wrist in use has a number of important advantages. For example, this enables the user to interact with the watch 500 using only a single finger. More specifically, the user is able to push the pressing surface of the user interface 506 with one finger because the user pushes the surface into the user's wrist around which the watch is strapped. This is on contrast to conventional watches wherein buttons are arranged around the peripheral edges of the watch and the user must press the button with one finger and use a thumb on the other edge of the watch to counter-balance the pressing force. Also, as will be described in more detail further below, the user interface 506 may define a chamber 536 that houses one or more other components, such as a GPS patch antenna 538 (see FIG. 8). By arranging the GPS antenna 538 at the inner side of the wrist the GPS antenna is in the optimum position for receiving GPS signals when worn by a runner, as the inner side of the wrist will be directed substantially upwards during running. As shown in FIG. 10, the plane defined by the substantially planar display of the display housing 504 is arranged at an angle to the place defined by the user interface 506, the dihedral angle 550 between the two planes being less than 90 degrees, and typically between 40 and 70 degrees.

Figure 6:
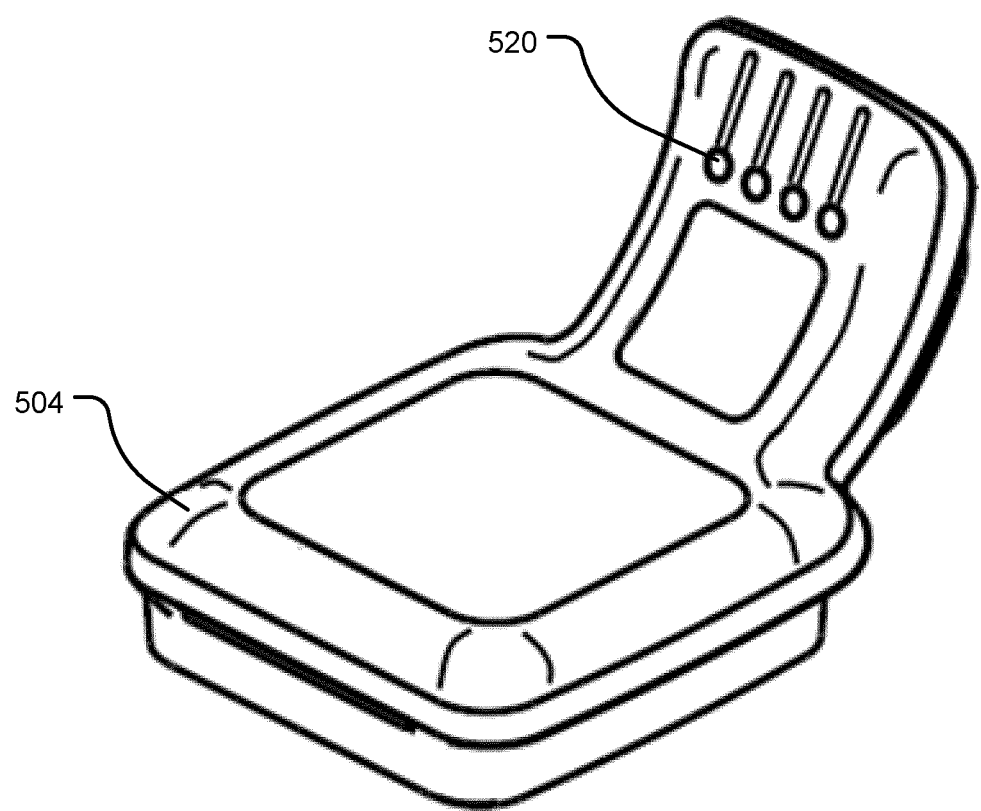
FIG. 6 shows the watch casing of FIG. 5 as viewed from the underside.

FIG. 6 shows a perspective view of the watch casing 502 from the underside of the casing. The flange 518 that extends from the display housing 504 has electrical connectors 520 arranged at a distal end thereof. These electrical connectors 520 may be used in order to electrically connect the casing 502 to another device in order to recharge a battery within the watch casing 502 or to extract data from or input data to the watch 500. As the electrical connectors 520 are arranged at the distal end of the flange 518 they are optimally arranged to be inserted into the slot of a docking device that has docking electrical connections for engaging the watch's electrical connections 520. Alternatively, the electrical connectors 520 of the watch 500 can be arranged to connect with a cable. It will be appreciated that removal of the strap 508 enables the watch 500 to be docked or connected to the cable easily. The electrical connectors 520 may be used as the input/output port 216 described in relation to FIG. 2.

Figure 8:
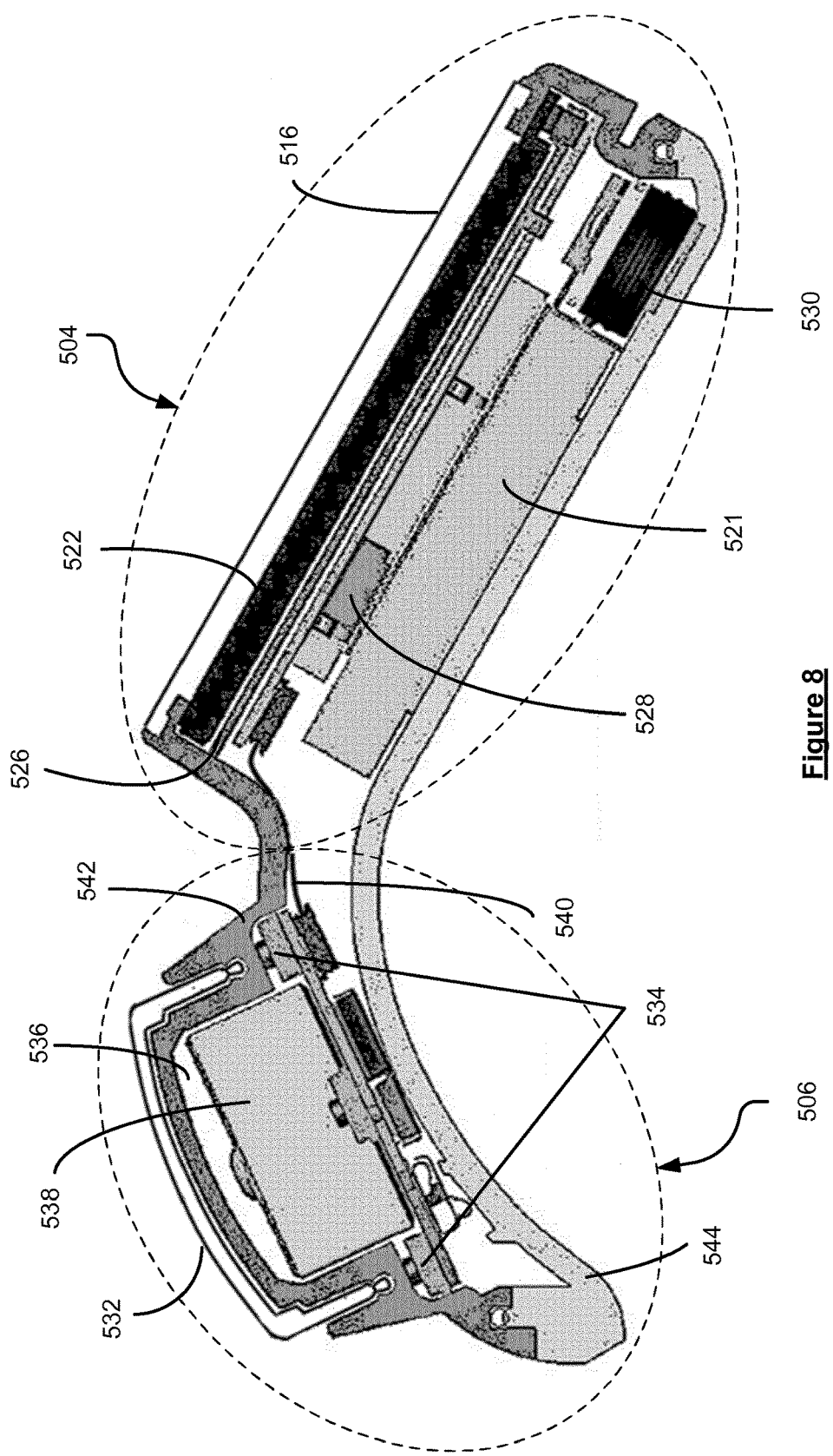
FIG. 8 shows a cross-section through the watch casing and illustrates the components within the casing.

FIG. 8 shows a cross-section through the casing 502 of the watch and shows the preferred arrangement of the basic components of the watch.

The display housing portion 504 comprises a battery (preferably a rechargeable battery) 521, a liquid crystal display (LCD) display 522, a lens screen 524 above the LCD display 522 and a printed circuit board (PCB) 526 below the LCD display 522. The PCB 526 will typically include the GNSS chipset, which is operatively connected to a patch antenna 538, and which is arranged to process the received satellite signals to determine the location and speed of the device. The PCB 526 further comprises a wireless communications device, such as a Bluetooth chipset, which is capable of using the Bluetooth Low Energy (BLE) protocol that forms part of the Bluetooth v4.0 specification, and can be used to form connections with one or more external sensors, such as a heart rate monitor and a foot pod sensor. The display housing portion 504 also comprises a pressure sensor 528 and a vibration device 530. The pressure sensor 528 serves to detect the ambient pressure of the environment that the watch 500 is in. For example, the sensor 528 may be used to detect pressure under water and may correlate this to an estimation of depth within the water. Alternatively, the pressure sensor 528 may be used to determine altitude. The vibration device 530 is arranged adjacent to the lower side of the casing 502 so as to be very near to the wearer of the watch. The vibration device 530 is configured to vibrate when activated so as to provide alerts to the user. As can be seen from FIG. 9, the watch casing 502 is formed as a single module with an upper casing 542 engaging with a lower casing 544, the electronic components of the watch being encased between the upper and lower casings.

The user interface portion 506 defines a chamber 536 in which watch components may be located. The chamber 536 may be defined by the button bezel 532 and the lower casing 544. The patch antenna 538 is located in the chamber 536. As described above in relation to FIG. 5, this arrangement enables the antenna 538 to sit on the medial side of the users wrist and therefore for the GPS antenna 538 to be directed upwards naturally when being worn during running. This is in contrast to conventional sports watches in which the GPS antenna is arranged under the display. As the displays in such conventional watches are designed to sit on the back of a user's wrist, the display, and hence the GPS antenna, does not face upwards whilst the user is running and so is not in the optimal position to receive GPS signals. The preferred location of the GPS antenna 538 outside of the display housing portion 504, according to the embodiments of the present invention, also enables the size of the watch housing portion 504 to be reduced for a given number of components. The electronics in the user interface portion 506 are electrically connected to the electronics in the display housing portion 504, such as by a ribbon cable 540.

The user interface portion 506 comprises a touchpad (or trackpad) 532 utilising, for example, capacitive sensing to conductance sensing to translate the motion of a user's finger into an input to control the watch. The touchpad may comprise a one-dimensional touchpad, and which is capable of sensing motion along a single axis, e.g. left-right or up-down. In other more preferred embodiments, the touchpad 532 comprises a two-dimensional touchpad, and which is capable of sensing motion in any direction, or at least left-right and up-down, on the plane defined by the substantially planar surface of the input means. The touchpad 532 is further configured to be depressible, for example for use in selecting desired functions within the menu system of the watch. This enables the user to use a single finger to operate the user interface. The user does not need to use a second finger of the same hand to counter-balance the pressing of the user interface, because the user interface is arranged such that it is pressed against the wrist of the user wearing the watch. As shown in FIG. 8, the depression of the touchpad is detected by the sensors 534, which translate the detected motion into an electrical signal for transmittal via the ribbon cable 540 to the relevant components within the display housing 504.

In other embodiments, the user interface portion 506 may utilise other types of input means, such as a pointing stick that senses the force applied by a user's finger, e.g. by using a pair of resistive strain gauges, and translates it into an input to control the watch. Alternatively, the input means may comprise a two-way button having a continuous pressing surface and two actuators, the button being configured such that when a first portion of the pressing surface is depressed a first of said actuators is actuated so as to provide a first input to control the watch, and when a second portion of the pressing surface is depressed a second of said actuators is actuated so as to provide a second input to control the watch. Alternatively, the input means may comprise a four-way button having a continuous pressing surface and four actuators, the button being configured such that when a first portion of the pressing surface is depressed a first of said actuators is actuated so as to provide a first input to control the watch, when a second portion of the pressing surface is depressed a second of said actuators is actuated so as to provide a second input to control the watch, when a third portion of the pressing surface is depressed a third of said actuators is actuated so as to provide a third input to control the watch, and when a fourth portion of the pressing surface is depressed a fourth of said actuators is actuated so as to provide a fourth input to control the watch. The pressing surface described herein is preferably said substantially planar surface parallel to and above a portion of the lower surface that contacts a user's arm or wrist in use. It is also contemplated that the user interface may comprise any one or more mechanically actuated buttons or non-mechanically actuated buttons, such as virtual buttons on a touch-sensitive user interface, as desired.

According a preferred embodiment of the present invention, a first sports watch communicates sensor data to at least one other sports watch and the first sports watch may also receive sensor data from at least one other sports watch. The sensor data may, for example, be location data that indicates the location of the sports watch transmitting the data. This enables the first sports watch to transfer its location to other sports watches so that each of the users of the other sports watches can compare their location to the location of the first sports watch. Similarly, the first sports watch may receive location data from the other sports watches so that the first sports watch is able to indicate the location of each of the other sports watches relative to the first sports watch. This may be useful, for example, if the users of such sports watches are competing against each other in a competition. Sports watches typically comprise location determining means, such as a GPS receiver, to detect their location and optionally current speed. Accordingly, the sensor data is preferably location and/or speed information from the GPS receiver. However, other types of sensor data may be transmitted in addition to location information, or instead of location information. For example, each sports watch may be associated with a speed (or velocity) sensor or an altitude sensor, and data from at least one of these sensors may be transmitted to other watches.

It is preferred that the sports watches transfer the sensor data to other sports watches using a Bluetooth protocol, such as Bluetooth Low Energy (BLE) protocol, which is a feature of the Bluetooth v4.0 specification. However, the sensor data is not transferred by using the protocol in its conventional data transfer mode. Rather, the data is transferred in a manner that reduces the power requirements in order to transfer the data and which therefore reduces the burden on the watch battery as compared to conventional communication techniques.

In order to assist in the understanding of the preferred data transfer method of the present invention, some of the basic and well known principles of a conventional Bluetooth protocol communication method will now be described. Bluetooth devices operating according to the BLE protocol have five basic operating states, which are: a standby state, an advertising state, a scanning state, an initiating state and a connection state. The standby state is the default state of a device in which the device does not transmit or receive any data packets. The advertising state is a state in which the device transmits advertising channel packets. When a device is in this state it is known as an advertiser. In the advertising state the advertiser may also listen to and respond to any responses that have been triggered from other devices that have received the advertising channel packets. The scanning state is a state in which the device listens for advertising channel packets from other devices. A device in the scanning state is known as a scanner. The initiating state is a state in which the device listens for advertising channel packets from a specific device and responds to these packets in order to initiate a data connection with the other specific device. A device in this state is known as an initiator. The connection state is a state in which the device has formed a data connection with another device. A device can enter the connection state from either the initiating state or from the advertising state. When a device enters the connection state from having been in the initiator state, the device takes the master role in the connection. In contrast, when a device enters the connection state from having been in the advertising state, the device takes the slave role in the connection.

Figure 9:
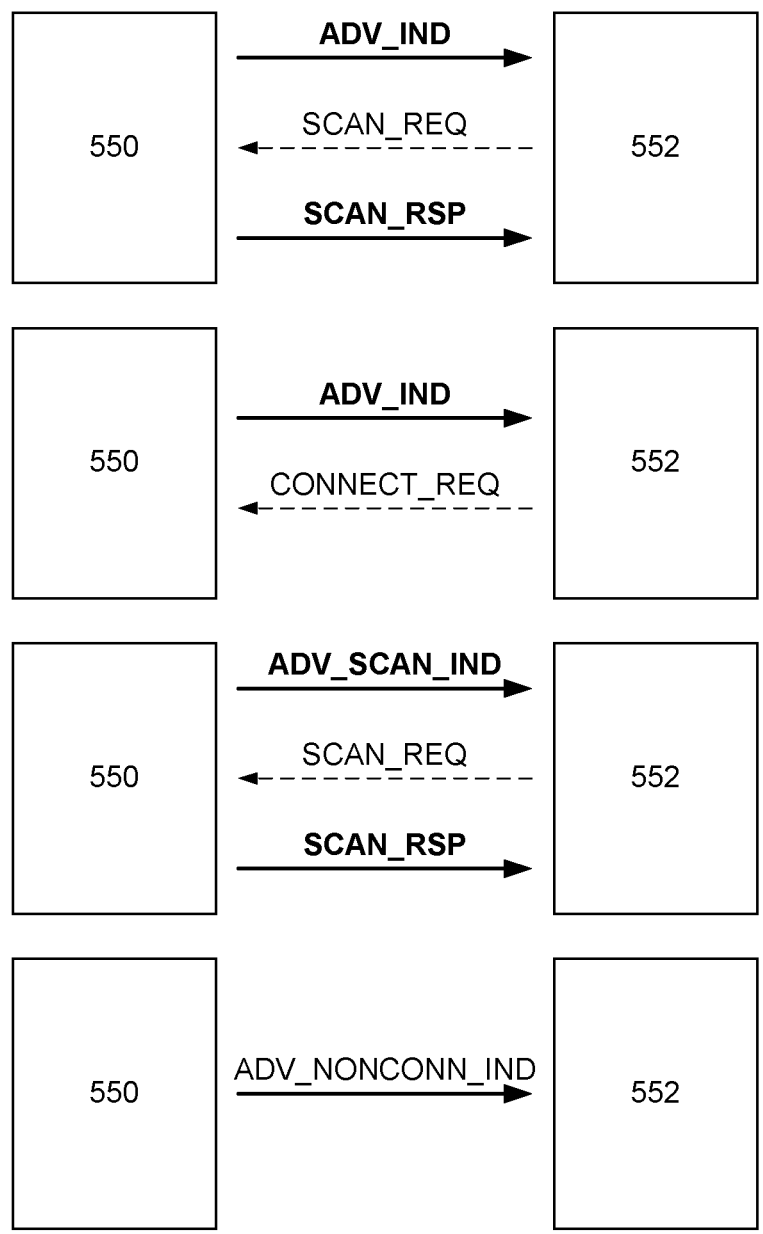
FIG. 9 shows a schematic of how a Bluetooth communication protocol operates.

The communication method of a conventional Bluetooth Low Energy (BLE) protocol device will now be described with reference to FIG. 9. FIG. 9 shows a first device 550 and a second device 552, which want to communicate data between each other. The first device 550 moves from its standby state to an advertising state and broadcasts an advertising channel packet having an advertising Protocol Data Unit (PDU). The BLE protocol has four initial advertising event types; three of which are undirected, i.e. are not intended for a specific receiver, and one that is directed. The three undirected advertising event types, which are depicted in FIG. 9, are: (i) a connectable undirected (ADV_IND) event, which allows a scanner or initiator to respond with either a scan request or connect request; (ii) a scannable undirected (ADV_SCAN_IND) event, which allows a scanner to respond with a scan request to request additional information about the advertiser; and (iii) a non-connectable undirected (ADV_NONCONN_IND) event, which allows a scanner to receiver information contained in the packet from the advertiser, but not to send any requests for further information. This advertising channel packet for each of the three undirected advertising event types includes the address of the first device 550 and can include additional data selected by the advertiser. The packets that can include such additional data are shown by the solid arrows in FIG. 9; the dotted arrows indicating packets that cannot include any additional data selected by the first and/or second device.

The second device 552 moves from its standby state to a scanning state in which it listens for advertising packets. The second device 552 has a scanner filter policy, which defines which advertising channel packets it will process. It may be configured to process advertising channel packets from a "white list" of selected devices or it may be configured to process all received advertising channel packets. The manner by which the If the advertising channel packet broadcast by the first device 500 is processed by the second device 502 is dependent upon the type of advertising channel packet that is received. Thus, for example, in the case of a connectable undirected advertising event packet, the second device 552 can broadcast either a scanning request (SCAN_REQ) packet or a connection request (CONNECT_REQ) packet. In the case of a scannable undirected advertising event packet, the second device 552 broadcasts a scanning request packet. Finally, in the case of a non-connectable undirected event, the second device 552 processes the received data packet, but does not broadcast a data packet in response. The scanning request and connection request packets each include the address of the first device 550 and the second device 552.

The first device 550, in a similar manner to the second device 552, has an advertising filter policy, which defines how the device will process any received scanning or connection request packets. For example, the first device 550 may be configured to process received scanning or connection request packets from a "white list" of selected devices or it may be configured to process all received scanning or connection request packets. If a scanning request packet sent from the second device 552 is processed by the first device 550, then the first device 550 will send a scanning response (SCAN_RSP) packet back to the second device 552. The scanning response packet includes the address of the first device 550 and can again include additional data selected by the advertiser. If a received connection request packet is processed by the first device 550, then the first device 550 will form a data connection to the second device 552. The PDU of the connection request message defines several parameters to be used during communication between the first and second devices 500, 502, such as the transmission window size and the timeout duration. The term "data connection" used herein it is meant that the transceivers of both the first and second devices 500, 502 are tuned to the same frequency channel at the same time and use the same access address for that channel. The second device 502 then operates in the master role and the first device 500 operates in the slave role. The data that was desired to be sent between the two devices is then sent through the data channel established by the data connection.

The above-described conventional communication method is a relatively low power method of wirelessly transferring data. However, the power demands of such a technique are still undesirably high for some applications. For example, sports watches such as those described above have relatively low capacity batteries and the GNSS location systems, such as a GPS receiver, in such watches require a significant proportion of the energy available from the battery. It is therefore desired to communicate data in an even more energy efficient manner.

According to the present invention, sensor data can be communicated between devices in a more energy efficient manner than has been done conventionally. The inventors have recognised that sensor data can be transmitted between devices without the need to establish a data connection between the two devices (i.e. without the transceivers of both devices being tuned to the same frequency channel at the same time) and that data can therefore be transferred in a less power intensive manner. More specifically, the inventors have recognised that sensor data tends to be relatively small and it may only be necessary to transfer sensor data to other devices at periodic and infrequent intervals, and that the sensor data can therefore be transmitted in the advertising channel packets, and specifically as the optional additional data that can be added by the advertiser to the initial advertising channel packets for each of the three undirected advertising event types and to the scanning response data packet.

Figure 11:
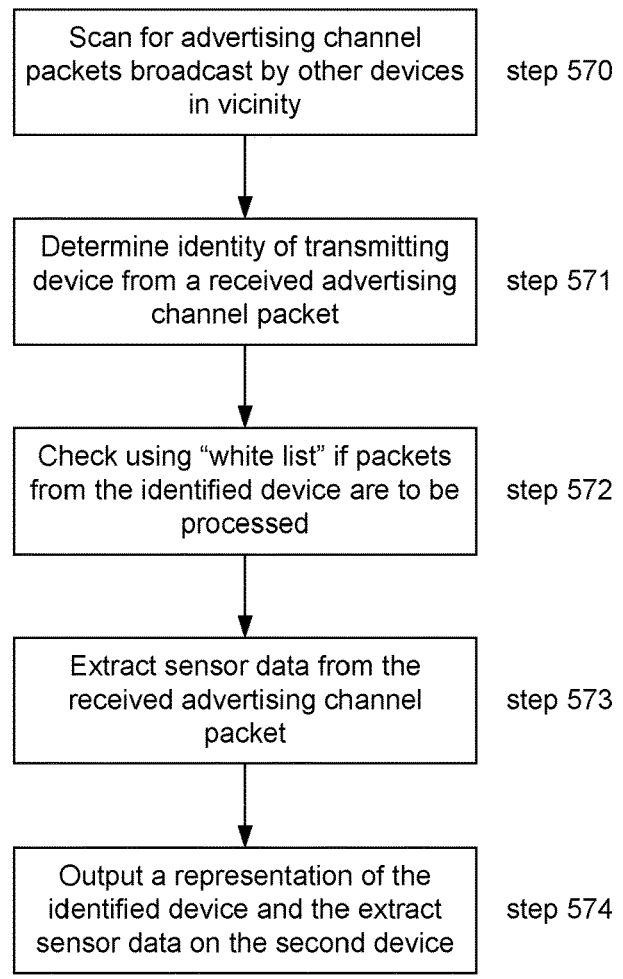
FIG. 11 is a flow diagram depicting the steps performed by a portable receiver device when operating in accordance with the preferred method.

A preferred method will now be described, with reference to FIGS. 10 and 11, wherein the first and second devices are sports watches and the sensor data is GNSS location and/or speed data. However, it will be appreciated that the invention also applies to other types of devices and to other types of sensor data. In the preferred method, the sports watches utilise a Bluetooth protocol to transfer data to each other, such as the BLE protocol. The first watch obtains GNSS location and/or speed data indicating the location and/or speed of the first watch by using its GNSS receiver (step 560). The first watch then adds this sensor data to the PDU of the advertising channel packet ADV_SCAN_IND or ADV_ NONCONN_IND that can be broadcast from the first watch when in the advertising state (step 561). One of these two advertising event types is used since neither can lead to a data connection being established between the first watch and another watch in the broadcast range of the first watch. A second watch operates in the scanning state and receives the advertising channel packet from the first watch (step 570). The second watch extracts the address (i.e. identity) of the first watch (step 571), optionally determines if the received packet should be processed based on a "white list" present on the device as discussed above (step 572), and the GNSS location and/or speed data from the advertising channel packet sent from the first watch (step 573). The first watch is therefore able to transfer its current location and/or speed to the second watch without establishing a data connection, which would drain the batteries of the two watches at a higher rate than transferring the data via broadcasting the advertising channel packets, and indeed may not be possible if the Bluetooth communications device in the first watch is already connected to other devices. As will be appreciated, a Bluetooth chip is typically only able to establish a couple of data connection channels at any given time. If all of such data channels are already in use then it is not possible to transfer data to or from that device. For example, a conventional sports watch may have established a Bluetooth connection with a heart rate monitor and a foot pad sensor, thereby occupying all of its data channels and leaving no data channels for transferring other data to or from the sports watch. In contrast, the present invention enables the sports watch to continue to use its data channels in the conventional manner, but still enables sensor data to be transferred to and from the device because the data transfers according to the present invention do not require a data communication channel to be established.

As discussed above, if a ADV_SCAN_IND packet is received by the second watch, it may broadcast a scanning request packet SCAN_REQ to the first device in response to the advertising channel packet received from the first watch. The first watch may then broadcast a scanning response packet SCAN_RSP in response to the scan request packet received from the second watch (steps 563 and 566). The first watch may add its address (i.e. identity) and updated GNSS location and/or speed data from the GNSS receiver into the PDU portion of the scanning response packet (steps 564 and 565). As such, when the second watch receives the scanning response packet from the first watch, the second watch can extract the address (i.e. identity) of the first watch and the updated GNSS location and/or speed data sent from the first watch. The second watch is then able to update the current location and/or speed information for the first watch and can indicate to the user of the second watch the new location and/or speed of the first watch relative to the second watch, or the updated distance between the two watches. Alternatively, or in addition to transmitting updated GNSS location and/or speed data in the scanning response packet, the first watch may add another type of sensor data into the scanning response packet to be sent to the second watch.

It will be appreciated that sensor data may be sent in only one, or in a combination of any two or more, of the advertising channel packets and the scanning response messages. It will also be appreciated that the second watch can operate in the advertising state and the first watch can operate in the scanning state. The second watch may therefore send sensor data to the first watch in a corresponding manner to that described in which the first watch sends sensor data to the second watch, i.e. in advertising channel packets and scan response messages.

The first and second watches do not form a data connection channel between them in order to transfer sensor data. This is prevented by the watches using message formats that only enable the watches to operate in the advertising, scanning or standby states and not to send a connection request message between the watches.

Although only two devices have been described, the invention may be used to transfer data to additional devices. For example, a third or further watches may transmit sensor data to the first and/or second watch in the same manner as described above in relation to the first and second watches transferring data to each other. Similarly, the first and/or second watch may transfer data to the third watch in the same manner as described above in relation to the first and second watches transferring data to each other. It will therefore be appreciated that each of the watches will be able to display the location of a plurality of other watches, provided that they are within range.

Each watch may be set to process the advertising channel packets, the scanning request messages or the scanning response messages from all other devices. This feature will enable each watch to display the sensor data from any other watch that is within range. Alternatively, each watch may be set to process the advertising channel packets, the scanning request messages or the scanning response messages from only selected devices (i.e. devices on a "white list"). This feature will enable each watch to only display the sensor data from certain other watches, such as watches from the same manufacturer. The user of each watch may be able to select the devices from which advertising channel packets, scanning request messages or scanning responses are processed. For example, a user may select that only advertising channel packets, scanning request messages or scanning responses are processed that are from individual watches, such as watches of known competitors or acquaintances.

It will be appreciated that the sensor data will be broadcast between the watches at a suitable frequency to allow the user of a watch to be kept informed about the status of their competitors. For example, advertising channel data packets with additional sensor data may be periodically broadcast once every 30 seconds to 2 minutes, or broadcast at a rate that is dependent on the speed at which the user or users is travelling. For example, sensor data will likely need to be transferred at a faster rate between a group of cyclists in comparison to a group of walkers.

As described above, the user interface portion 506 of exemplary watches than are arranged to operate using the method of embodiments of the present invention comprises a trackpad that can detect the movement of a user's finger in two dimensions across its surface. This is particularly useful for navigating the menu system displayed by the display 522. The embodiments of the present invention preferably use a "cube" design menu system, such as that shown in FIG. 12. The "cube" menu system is so called as it resembles the structure of a cube if the cube faces were unfolded.

Figure 12:
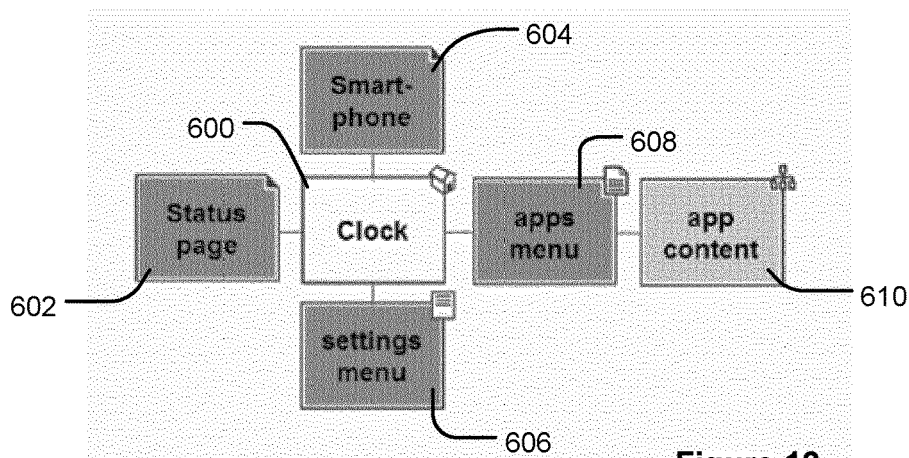
FIG. 12 shows a schematic of the preferred menu system on the watch.
Figure 13:
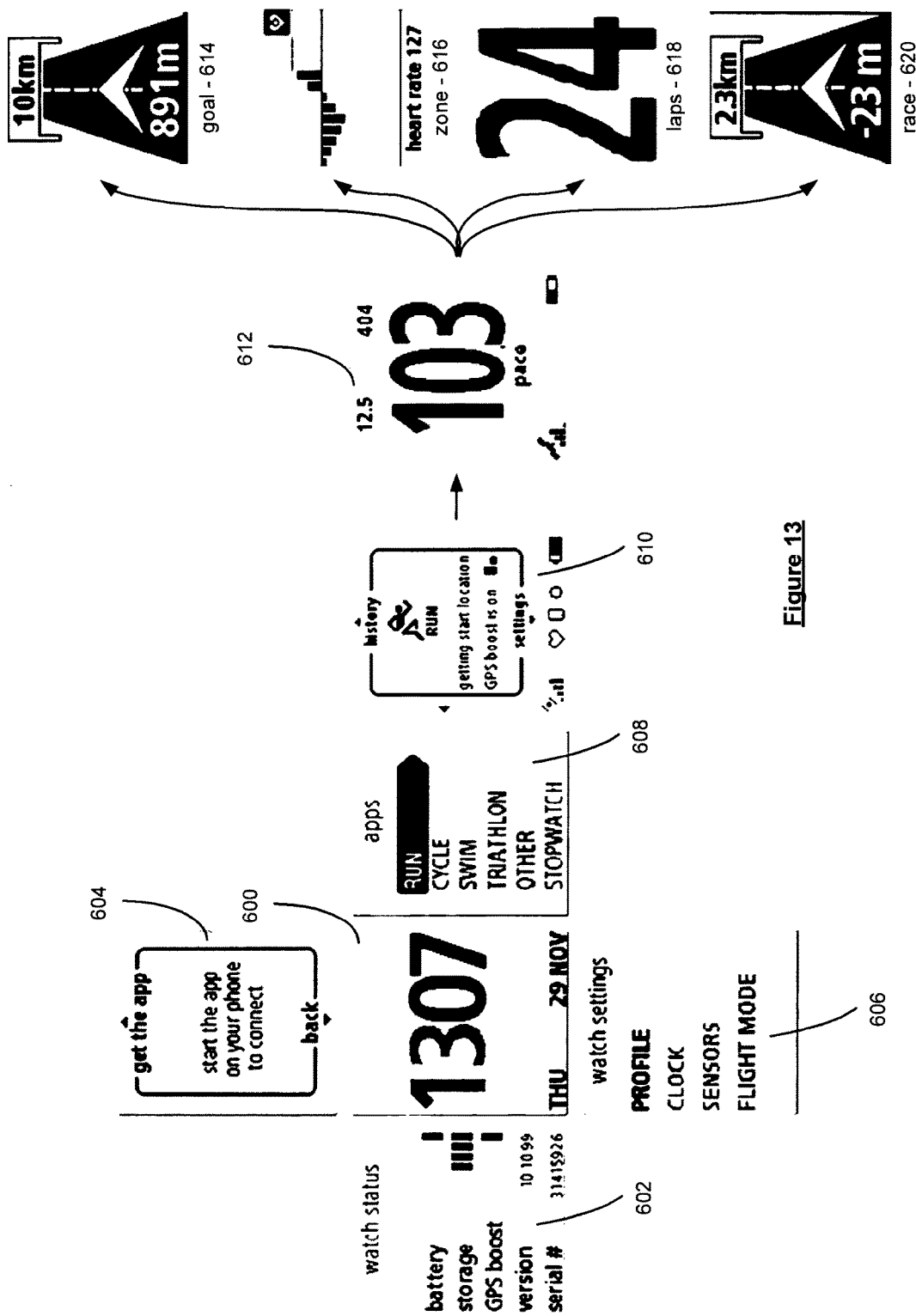
FIG. 13 shows examples of display screens that may be displayed by the watch for the menu system depicted in FIG. 12.

FIG. 12 shows a generic schematic of a menu system and FIG. 13 shows an example of the type of content that may be included in each part of the menu system. As shown in FIGS. 12 and 13, the display may have a default home screen 600 that may display a clock or other information. The user is able to indicate an up, down, left or right movement on the trackpad 532 movement in order to navigate to four different paths of the menu system. In this example, if the user moves their finger to the left across the trackpad 532, then the screen navigates to the status page 602, which may display status information such as the battery level, the available storage capacity, the GPS reception level, the software version that is installed or the serial number of the watch 500.

In this example, if the user moves their finger upwards across the trackpad 532, then the screen navigates from the home page 600 to the smart-phone page 604. This page of the menu system may be used to initiate or control a connection with a smart-phone.

In this example, if the user moves their finger downwards across the trackpad 532, then the screen navigates from the home page 600 to the settings page 606. This enables the user to check or change the settings of the watch 500. For example, the user may view or change the watch profile, the clock, the watch sensors or the connectivity (e.g. between an aeroplane flight mode and a non-flight mode). The user may navigate up and down the individual options within the settings menu by suitable motions across the trackpad 532, and may select which of the settings to view or change by using a left or right motion across the trackpad 532 or by depressing the trackpad 532. This may take the user to further menu pages which are not illustrated in FIGS. 12 and 13.

In the example shown, if the user if the user moves their finger to the left across the trackpad 532, then the screen navigates from the home page 600 to the applications menu 608. The user may then select the type of mode that they wish to use the watch in. For example, the user may select a run mode, a cycle mode, a swimming mode, such as a pool mode and/or an open swimming mode, or a triathlon mode. The user may navigate up and down the individual options within the applications menu by suitable motions across the trackpad 532, and may select which of the modes to use by using a left or right motion across the trackpad 532 or by depressing the trackpad 532. This takes the user to the application content page 610. In the example shown in FIG. 13, the run mode has been selected and the applications content page is configured for the running mode. Once the GPS location of the device has been determined, then the watch will display the running page 612 showing the pace, distance travelled (top left) and estimated calories used (top right).

FIG. 13 shows four other displays that may be displayed by the watch once a training mode has been selected. The watch 500 may indicate alerts to the user, such a when the user is starting a new lap or when the user has reached a particular target or goal. Such alerts may be provided to the user by a speaker on the watch 214, by the display 210, 522 of the watch 500 or by the vibration device 530 of the watch.

Screen 614 shows a "goal" mode, wherein the user has indicated the target distance that the user wishes to travel and the watch displays the distance from the current location to that target. In the example illustrated, the user has input to the watch that the goal is to travel 10 km and the watch is indicating that the distance from the current location to reach this 10 km goal is 7.5 km.

Screen 616 shows a "zone" mode, wherein the watch displays the heart rate of the user. The display also shows a bar chart of how the user's heart rate varies with time with respect to a target heart rate selected by the user.

Screen 618 shows a "lap" mode, which displays the number of laps of a circuit that the user has travelled. For example, the watch may count the number of laps of a swimming pool that the user has travelled or the number of times a predefined distance has been run, e.g. round a conventional 400 m running track.

Screen 620 shows a "race me" mode. This display is similar to that of the goal mode 614, except that a second arrow is present to indicate the location of another competitor that the user is racing. The overall distance of the race is displayed in a similar manner to that of the goal mode 614, although in this example the race distance is only 2.3 km. The distance between the user and the competitor is also shown and is 23 m in this example. The second arrow may be representative of a virtual competitor whose progress is generated by the watch 500, e.g. based on requirements previously input by the user. In other embodiments, however, the second arrow may be representative of a real competitor when the device receives location and/or pace data from another nearby device in BLE advertising channel data packets in accordance with embodiments of the present invention.

Figure 14:
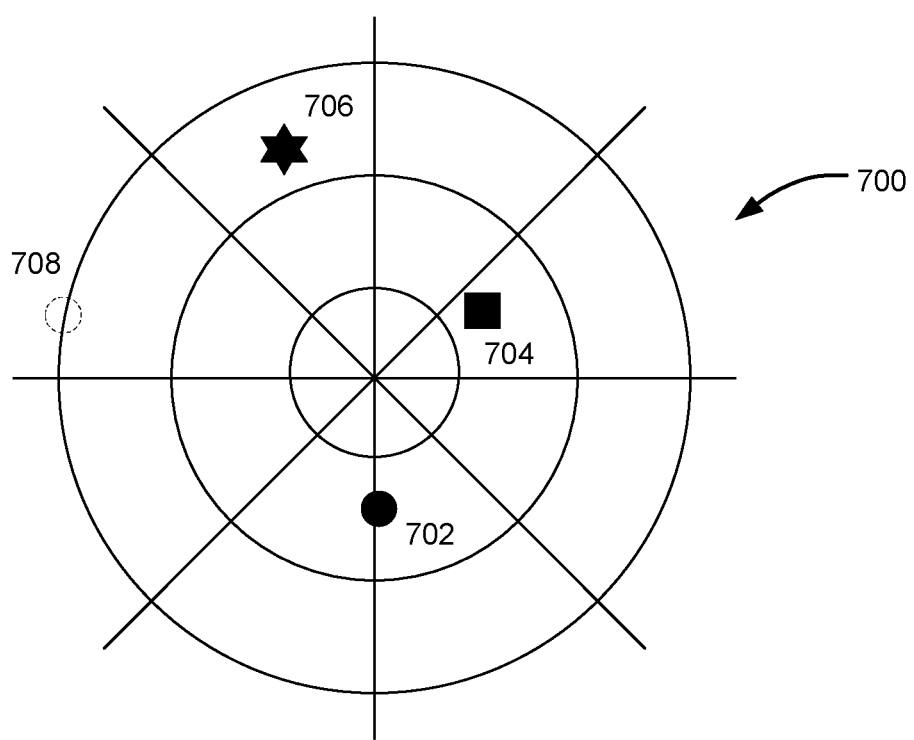
FIG. 14 shows other exemplary ways of displaying the relative location of competitors on a portable personal training device.

The "race me" mode screen 620 described above is one example of indicating the current relative distance and/or speed between competitors. Another example will now be described with reference to FIG. 14. As shown in FIG. 14, each watch may have a radar style screen 700 that shows the relative positions of all of the other watches that have been detected (i.e. from which advertising channel packets have been processed). The location of each watch may be indicated by a unique icon 702, 704, 706, which may be chosen by the users of the respective watches and transferred along with the sensor data. The display of any given watch may show the location of the other watches relative to a compass direction on said given watch such that the direction of the location of the other watches can be determined by the user of the watch no matter what angle the watch is viewed from. A watch's own location may always be displayed at a predetermined point (e.g. the centre of the radar style screen 700) or by its own unique icon. The distance on the display from this point or icon of the icons for the other detected watches may be proportional to the actual distance to the other watches. The watch may only indicate other watches that are detected to be within a predetermined distance. Alternatively, watches that are detected to be at a distance greater than the predetermined distance may be indicated by icons 708 at the maximum distance on the display, e.g. at a point on a ring at the edge of the display.

Alternatively, any given watch may be configured such that a user can select one of the other detected watches to remain at a predetermined location on the display and for said given watch to show its own location as moving relative to the predetermined location when said given watch moves relative to the other detected watch.

Each watch receives the identities and sensor data from other watches. Each watch may be configured to transfer identities and sensor data received from the other watches when it transfers its own identity and sensor data to another watch or other watches (and preferably in the same manner). As such, the watches are able to receive the identities and sensor data from other watches that are outside of their range, as this information is retransmitted by a watch that is inside of range. This serves to increase the range of the network, without requiring high power transceivers.

If other watches are not detected for a predetermined length of time then the icons for these watches may be removed from the display or may be indicated as not having been detected for the predetermined length of time, e.g. by being shown as a faded icon.

The watch may be configured such that the user can select an icon for another watch and determine data regarding the other watch. For example, the user may be able to determine more information about the identity of the user of the other watch, such as their full name, or further details regarding their location. Such additional data may be received by the watch in the same manner as the senor data. Alternatively, or additionally, the watch may indicate more details of the last known location and/or last time at which the other watch was detected.

Another exemplary use of the invention will now be described with reference to a group of cyclists travelling in the form of a peloton. In such a situation, each rider in the peloton may be associated with a watch; the watch being configured to transfer data indicating its identity and location, e.g. by reference to the position of the rider in the peloton, in the manner discussed above. One or more alerts can be given to a rider based on their location in the peloton relative to other riders, e.g. in the form of an audio and/or visual and/or haptic warning. For example, an alert can be given to a user when it is their turn to move to the front of the peloton. An alert could also be given to a user when one or more riders drop off the back of the peloton. It will be understand that similar functionality can be provided in other activities where a group of users need to travel in some type of formation.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

Although the preferred method has been described in relation to the transferred sensor data being location data, additional or alternative types of sensor data may be transferred. For example, data from any one or combination of a speed sensor, a velocity sensor, an orientation sensor or an altitude sensor may be transferred. The device that this data is transferred to may display this data from the other device, or may display the difference between this sensor data and the corresponding sensor data of the device that the data has been transferred to, e.g. to display a difference in speed, orientation or altitude.

Although the preferred method has been described in relation to sports watches, it will be appreciated that sensor data may be transferred to and from any other type of device using the methods of the present invention. Other devices, such as other personal training or mobile devices may use the present invention. For example, mobile telephones may have applications installed thereon that operate in the manner of the present invention.

Although the preferred method has been described in relation to Bluetooth communication, other short-range communication techniques and protocols, e.g. with a broadcast range of around 100 m or less, are contemplated by the present invention wherein one device operates in an advertising mode to broadcast data packets and another device operates in a scanning mode to receive and process such data packets, without forming a data connection between the devices.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A portable device, comprising: at least one sensor device; a transmitter; a receiver; a processor; and an output device, wherein the device is configured to:
   obtaining, from said at least one sensor device, first sensor data, said first sensor data being based on information that was sensed by said at least one sensor device from an external environment of the portable device and/or from a user of the portable device;
   operate in an advertising state in which the processor is arranged to assemble the first sensor data into a first data packet along with an first identifier for identifying the portable device; and control the transmitter to wirelessly broadcast said first data packet to one or more other portable devices;
   operate in a scanning state in which the processor is arranged to use the receiver to scan for second data packets wirelessly broadcast by said one or more other portable devices, wherein each second data packet comprises second sensor data and a second identifier for identifying the other portable device from which the second data packet was transmitted, wherein the second sensor data is representative of at least one property of the respective other portable device and/or user associated with the respective other portable device; and, when a second data packet is received by the receiver, determine the identity of the other portable device from the second identifier in the received second data packet and extract the second sensor data from the received second data packet; and
   provide an output using the output device to indicate: (i) the identity of the other portable device; and (ii) the first sensor data and the second sensor data, or a relative difference therebetween.

2. The portable device of claim 1, wherein the processor is arranged to periodically and repeatedly perform the steps of: assembling the first sensor data into the first data packet along with the first identifier for identifying the portable device; and controlling the transmitter to wirelessly broadcast said first data packet to the one or more other portable devices.

3. The portable device of claim 1, wherein the portable device is configured to transfer the first sensor data in said first data packet to the one or more other portable devices without at least one of: being required to detect said one or more other portable devices; and having to establish a data connection with said one or more other portable devices by being tuned to the same frequency channel at the same time.

4. The portable device of claim 1, wherein the transmitter is configured to broadcast said first data packet using a Bluetooth protocol, and wherein said first data packet is a Bluetooth advertising channel packet and the processor is configured to add the first identifier and first sensor data to the Bluetooth advertising channel packet.

5. The portable device of claim 4, wherein the transmitter is configured to broadcast said first data packet using a Bluetooth Low Energy protocol.

6. The portable device of claim 1, wherein the first and second sensor data is representative of one or more of: a geographical location; a speed; an orientation; an acceleration; an altitude; and a heart rate.

7. The portable device of claim 1, wherein the output device is arranged to provide the output at least one of: audibly; visually; and haptically.

8. The portable device of claim 1, wherein the receiver is configured to scan and receive said second data packet using a Bluetooth protocol, and wherein the processor is configured to extract the second identifier and the second sensor data from Bluetooth advertising data packets that are received.

9. The portable device of claim 1, wherein the output device comprises a display device and the output comprises an icon representing the identity of the other portable device.

10. The portable device of claim 1, wherein the portable device is configured to only extract and provide the second sensor data from a second data packet that is received from a portable device having an identity on a list of predefined identities.

11. The portable device of claim 10, wherein the list of predefined identities is modifiable by a user.

12. The portable device of claim 1, wherein the device is a personal training device.

13. A method of operating a portable device, said portable device comprising: at least one sensor device; a transmitter; a receiver; a processor; and an output device, said method comprising:

obtaining, from said at least one sensor device, first sensor data, said first sensor data being based on information that was sensed by said at least one sensor device from an external environment of the portable device and/or from a user of the portable device;

operating the portable device in an advertising state in which the processor is arranged to assemble the first sensor data into a first data packet along with an first identifier for identifying the portable device; and control the transmitter to wirelessly broadcast said first data packet to one or more other portable devices;

operating the portable device in a scanning state in which the processor is arranged to use the receiver to scan for second data packets wirelessly broadcast by said one or more other portable devices, wherein each second data packet comprises second sensor data and a second identifier for identifying the other portable device from which the second data packet was transmitted, wherein the second sensor data is representative of at least one property of the respective other portable device and/or user associated with the respective other portable device; and, when a second data packet is received by the receiver, determine the identity of the other portable device from the second identifier in the received second data packet and extract the second sensor data from the received second data packet; and providing an output using the output device to indicate: (i) the identity of the other portable device; and (ii) the first sensor data and the second sensor data, or a relative difference therebetween.

14. The method of claim 13, comprising periodically and repeatedly performing the steps of: assembling the first sensor data into the first data packet along with the first identifier for identifying the portable device; and controlling the transmitter to wirelessly broadcast said first data packet to the one or more other portable devices.

15. The method of claim 13, comprising transferring the first sensor data in said first data packet to the one or more other portable devices without at least one of: being required to detect said one or more other portable devices; and having to establish a data connection with said one or more other portable devices by being tuned to the same frequency channel at the same time.

16. The method of claim 13, comprising broadcasting said first data packet using a Bluetooth protocol, and wherein said first data packet is a Bluetooth advertising channel packet, the method comprising adding the first identifier and first sensor data to the Bluetooth advertising channel packet.

17. The method of claim 13, comprising receiving said second data packet using a Bluetooth protocol, and extracting the second identifier and the second sensor data from a Bluetooth advertising data packet that is received.

18. The method of claim 13, comprising only extracting and providing the second sensor data from a second data packet that is received from a portable device having an identity on a list of predefined identities.

19. The method of claim 18, wherein the list of predefined identities is modifiable by a user.

20. A non-transitory computer readable medium comprising computer readable instructions that, when executed on a processor of a portable device, causes the portable device to perform a method of operating a portable device, said portable device comprising: at least one sensor device; a transmitter; a receiver; a processor; and an output device, said method comprising:

obtaining, from said at least one sensor device, first sensor data, said first sensor data being based on information that was sensed by said at least one sensor device from an external environment of the portable device and/or from a user of the portable device;

operating the portable device in an advertising state in which the processor is arranged to assemble the first sensor data into a first data packet along with an first identifier for identifying the portable device; and control the transmitter to wirelessly broadcast said first data packet to one or more other portable devices;

operating the portable device in a scanning state in which the processor is arranged to use the receiver to scan for second data packets wirelessly broadcast by said one or more other portable devices, wherein each second data packet comprises second sensor data and a second identifier for identifying the other portable device from which the second data packet was transmitted, wherein the second sensor data is representative of at least one property of the respective other portable device and/or user associated with the respective other portable device; and, when a second data packet is received by the receiver, determine the identity of the other portable device from the second identifier in the received second data packet and extract the second sensor data from the received second data packet; and providing an output using the output device to indicate: (i) the identity of the other portable device; and (ii) the first sensor data and the second sensor data, or a relative difference therebetween.

\* \* \* \* \*